(12) United States Patent
Gentner et al.

(10) Patent No.: US 8,967,653 B2
(45) Date of Patent: Mar. 3, 2015

(54) TRAILER COUPLING

(75) Inventors: Wolfgang Gentner, Steinheim (DE); Bernhard Rimmelspacher, Rheinstetten (DE); Bert Wegner, Gingen (DE); Juergen Still, Ludwigsburg (DE); Joerg Riehle, Asperg (DE)

(73) Assignee: Scambia Holdings Cyprus Limited, Limassol (CY)

( * ) Notice: Subject to any disclaimer, the term of this patent is extended or adjusted under 35 U.S.C. 154(b) by 0 days.

(21) Appl. No.: 13/612,174

(22) Filed: Sep. 12, 2012

(65) Prior Publication Data

US 2013/0093162 A1 Apr. 18, 2013

(30) Foreign Application Priority Data

Sep. 12, 2011 (DE) .......................... 10 2011 053 506

(51) Int. Cl.
*B60D 1/54* (2006.01)
*B60D 1/06* (2006.01)

(52) U.S. Cl.
CPC ... *B60D 1/06* (2013.01); *B60D 1/54* (2013.01)
USPC ...................................................... 280/491.3

(58) Field of Classification Search
CPC ................................... B60D 1/54; B60D 1/40
USPC ................ 280/491.1, 491.3, 478.1
See application file for complete search history.

(56) References Cited

U.S. PATENT DOCUMENTS

| | | | | |
|---|---|---|---|---|
| 6,234,511 B1 * | 5/2001 | Gentner et al. | ............. | 280/479.1 |
| 6,547,271 B2 * | 4/2003 | Kleb et al. | ................. | 280/491.3 |
| 6,908,095 B2 * | 6/2005 | Reutlinger et al. | ........ | 280/491.3 |
| 7,273,222 B2 * | 9/2007 | Rampp | ..................... | 280/491.3 |
| 2002/0020988 A1 | 2/2002 | Kleb et al. | | |
| 2003/0075900 A1 * | 4/2003 | Kleb et al. | ................. | 280/491.3 |

FOREIGN PATENT DOCUMENTS

| | | |
|---|---|---|
| DE | 198 59 961 A1 | 7/2000 |
| DE | 19859961 A1 | 7/2000 |
| DE | 10252722 | 2/2004 |
| DE | 10329622 | 1/2005 |
| DE | 102006044401 A1 | 3/2008 |
| EP | 1142732 A2 | 10/2001 |
| EP | 1902870 A1 | 3/2008 |
| EP | 2149460 A1 | 2/2010 |
| EP | 2163410 A1 | 3/2010 |

* cited by examiner

*Primary Examiner* — Tony Winner
(74) *Attorney, Agent, or Firm* — Reinhart Boerner Van Deuren P.C.

(57) ABSTRACT

For a trailer coupling, the fixing unit has a stationary first toothed segment which is fixedly connected to the pivot bearing base. A first toothed segment which in the working position is connected to the pivot element in a rotationally fixed manner and pivots together with same and is engageable by displacing the pivot element from the pivot position into the fixed position, and is disengageable by displacing the pivot element from the fixed position into the pivot position.

47 Claims, 19 Drawing Sheets

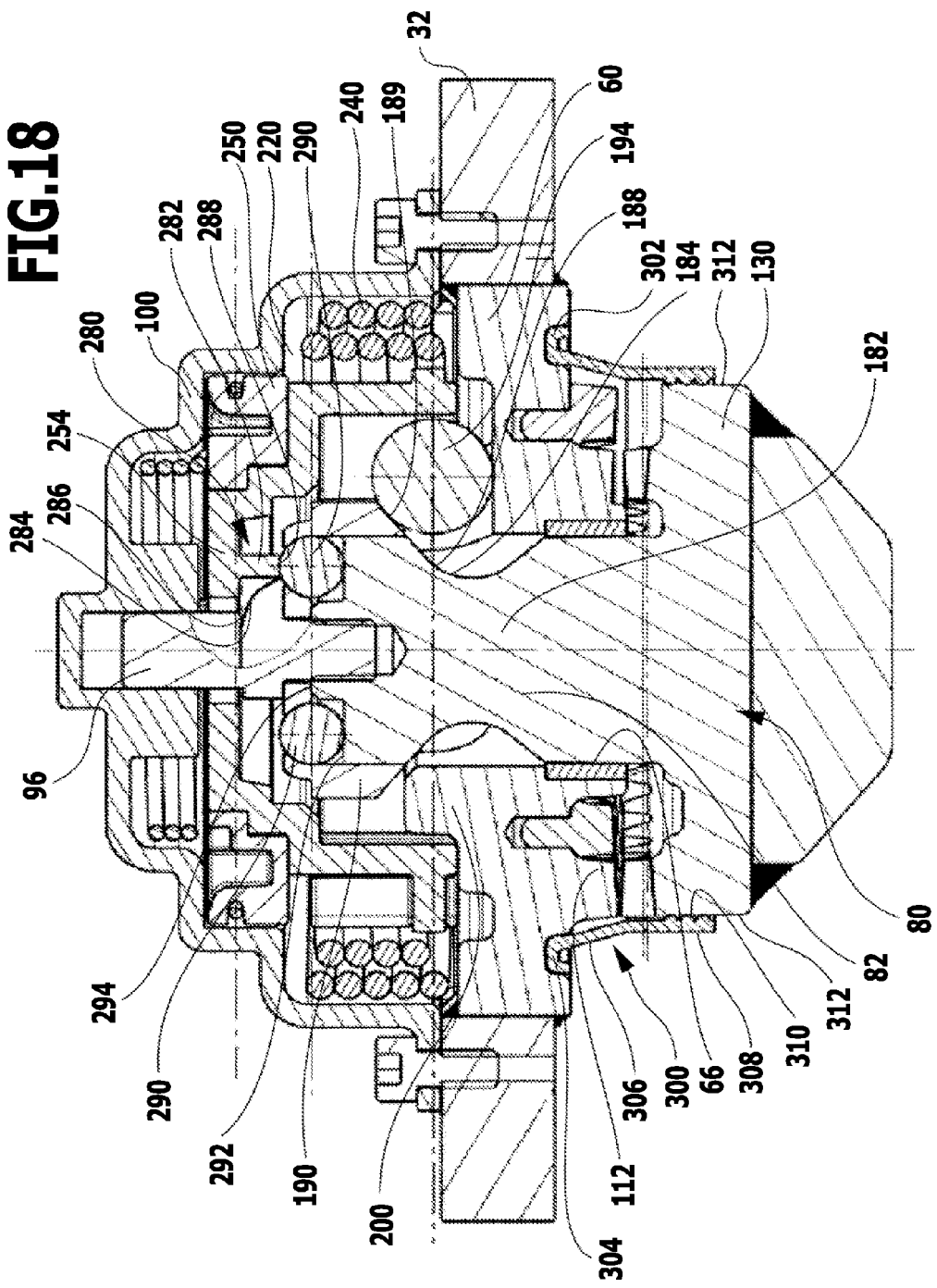

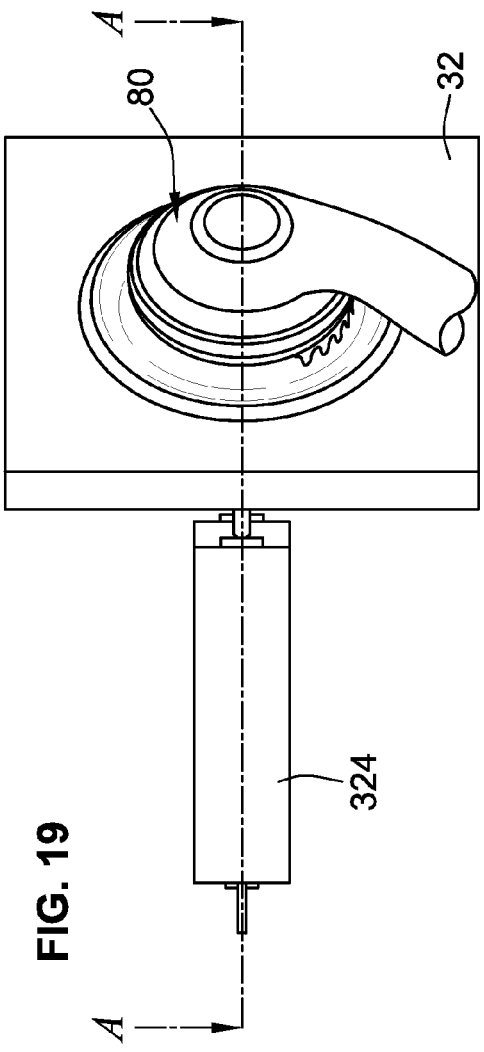
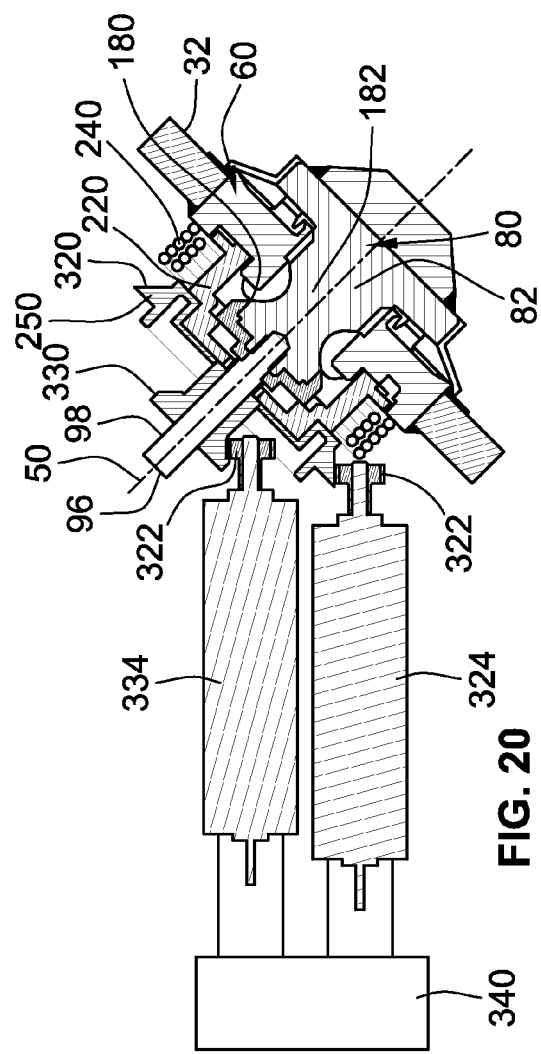

TRAILER COUPLING

CROSS-REFERENCE TO RELATED PATENT APPLICATIONS

This patent application claims the benefit of German application No. 10 2011 053 506.3, filed Sep. 12, 2011, the teachings and disclosure of which are hereby incorporated in their entirety by reference thereto.

BACKGROUND OF THE INVENTION

The invention relates to a trailer coupling comprising a mounting unit which is fixedly connectable to a vehicle body; a pivot bearing unit, provided on the mounting unit, having a pivot bearing base which is fixedly connected to the mounting unit, and having a pivot element which is pivotable about a pivot axis, relative to the pivot bearing base, between a working position and a rest position, and is displaceable in the direction of the pivot axis between a fixed position and a pivot position; a ball neck which at one end is mounted on the pivot element and which at the other end carries a coupling ball, and which, due to the pivotability of the pivot element, is pivotable about the pivot axis between the working position and the rest position, and due to the displaceability of the pivot element is displaceable between the fixed position and the pivot position; a fixing unit which in the fixed position of the pivot element fixes the pivot element, and thus also the ball neck, relative to the pivot bearing base in a rotationally fixed manner by means of positive-fit elements, and in the pivot position allows pivoting of the pivot element; and a locking unit, which acts axially against a displacement in the direction of the pivot axis, by means of which, in the fixed position, the fixing unit is fixable against a movement in the direction of the pivot position.

These types of trailer couplings are known from the prior art.

For such pivotable trailer couplings, there is a fundamental need to fix the ball neck together with the pivot element on the pivot axis in a rotationally fixed manner as stably as possible in the working position, and to achieve the most cost-effective and space-saving design possible.

SUMMARY OF THE INVENTION

For a trailer coupling of the aforementioned type, this object is achieved according to the invention in that the fixing unit has a stationary first toothed segment which is fixedly connected to the pivot bearing base, by means of which a first toothed segment which in the working position is connected to the pivot element in a rotationally fixed manner and pivots together with same, is engageable by displacing the pivot element from the pivot position into the fixed position, and is disengageable by displacing the pivot element from the fixed position into the pivot position.

The advantage of this solution is that it represents a stable, easily achievable, and in particular space-saving approach for fixing the pivot element relative to the pivot bearing base.

Within the meaning of the solution according to the invention, a toothed segment is understood to mean not a toothed ring which encircles the pivot axis, but, rather, a segment of such a toothed ring.

This type of toothed segment preferably extends around the pivot axis over a curved segment of at most 180°, preferably at most 120°.

To be able to fix the pivot element also in the rest position, it is preferably provided that the fixing unit has a further first toothed segment which is fixedly connected to the pivot bearing base or connected to the pivot element in a rotationally fixed manner, by means of which, in the rest position, the first toothed segment, which is connected to the pivot element in a rotationally fixed manner and pivots together with same, or which is fixedly connected to the pivot bearing base, in the rest position is engageable by displacing the pivot element from the pivot position into the fixed position, and is disengageable by displacing the pivot element from the fixed position into the pivot position.

The advantage of this approach is that, also in the rest position, a simple option is provided for fixing the pivot element relative to the pivot bearing base.

To further improve the fixing of the pivot element relative to the pivot bearing base by means of the fixing unit, it is preferably provided that the fixing unit has a stationary second toothed segment which is fixedly connected to the pivot bearing base, by means of which, in the working position, a second toothed segment which is connected to the pivot element in a rotationally fixed manner and pivots together with the pivot element, is engageable by displacing the pivot element from the pivot position into the fixed position, and is disengageable by displacing the pivot element from the fixed position into the pivot position.

The advantage of this approach is that the second toothed segment is thus also able to assist in fixing the pivot element relative to the pivot bearing base.

The stability of the fixing by means of the first toothed segments and the second toothed segments may preferably be further improved if the first toothed segments and the second toothed segments are in each case situated substantially opposite one another relative to the pivot axis, so that a rotationally fixed fixing of the pivot element relative to the pivot bearing base is achieved on both sides of the pivot axis.

The term "substantially opposite" is understood to mean that the centers of the first toothed segment and of the corresponding second toothed segment are in each case rotated relative to one another by an angular distance of 150° to 210°.

To achieve fixing of the pivot element relative to the pivot bearing base, also in the rest position, by means of a plurality of interacting toothed segments, it is preferably provided that the fixing unit has a further second toothed segment which is fixedly connected to the pivot bearing base or connected to the pivot element in a rotationally fixed manner, by means of which, in the rest position, the second toothed segment, which is connected to the pivot element in a rotationally fixed manner and pivots together with the pivot element or which is fixedly connected to the pivot bearing base, is engageable by displacing the pivot element from the pivot position into the fixed position, and is disengageable by displacing the pivot element from the fixed position into the pivot position.

Another advantage of this approach is that, also in the rest position, it is possible to fix the pivot element relative to the pivot bearing base with respect to the pivot axis by means of toothed segments which are substantially opposite one another.

Within the scope of the exemplary embodiments described heretofore, it has been provided that the further first and second toothed segments are stationary first and second toothed segments, or that instead of the further stationary first and second toothed segments, further first and second toothed segments which are co-pivotable may be provided in order to fix the pivot element relative to the pivot bearing base in the rest position. In this case, the further toothed segments are then fixedly connected to the pivot element, not to the pivot bearing base.

Heretofore, no further detailed information has been provided with regard to the arrangement of the first toothed segments and the second toothed segments relative to one another in the radial direction.

It is particularly advantageous if the first toothed segments are situated at a first radial distance from the pivot axis, and the second toothed segments are situated at a second radial distance from the pivot axis which is different from the first radial distance, so that the first toothed segments and the second toothed segments are movable relative to one another without colliding when the pivot element moves about the pivot axis and in the direction of the pivot axis.

That is, the first and second toothed segments are not mutually engageable with one another; rather, only first toothed segments are engageable with first toothed segments, and only second toothed segments are engageable with second toothed segments.

Heretofore, no further detailed information has been provided with regard to the arrangement of the toothed segments.

Thus, an advantageous solution provides that the first toothed segment, which is pivotable together with the pivot element, is disposed on a positive-fit element carrier of the pivot element.

Providing a positive-fit element carrier allows the toothed segments to be easily positioned, the positive-fit element carrier then being easily connectable to the pivot element.

It is particularly advantageous if the co-pivotable first toothed segment is integrally formed onto the positive-fit element carrier of the pivot element.

Likewise, no further detailed information has been provided with regard to the stationary first toothed segments.

Thus, an advantageous solution provides that the stationary first toothed segment is stationarily disposed on a positive-fit element carrier which is fixedly connected to the pivot bearing base.

Providing a positive-fit element carrier on the pivot bearing base likewise allows the toothed segments to be easily positioned, and the positive-fit element carrier to then be fixed relative to the pivot bearing base.

It is particularly advantageous if the stationary first toothed segment is integrally formed onto the positive-fit element carrier.

With regard to the further first toothed segment, it is likewise provided that the further first toothed segment is fixedly disposed on the particular positive-fit element carrier.

It is preferably provided that the further first toothed segment is disposed on the particular positive-fit element carrier in a positive-fit manner, and is therefore easily positionable corresponding to the intended rest position.

With regard to the co-pivoting second toothed segment, it is preferably provided that the co-pivoting second toothed segment is disposed on the positive-fit element carrier of the pivot element, in the same manner as for the co-pivoting first toothed segment.

It is preferably provided that the co-pivoting second toothed segment is integrally formed onto the positive-fit element carrier of the pivot element.

With regard to the stationary second toothed segment, it is provided that the stationary second toothed segment is stationarily disposed on the positive-fit element carrier which is fixedly connected to the pivot bearing base.

To be able to achieve the tightest connection possible, it is provided that the stationary second toothed segment is integrally formed onto the positive-fit element carrier.

With regard to the further second toothed segment, it is likewise provided that the further second toothed segment is fixedly disposed on the particular positive-fit element carrier, the further second toothed segment preferably being disposed on the particular positive-fit element carrier in a positive-fit manner, and thus likewise being easily positionable corresponding to the rest position.

As an alternative or in addition to the previously described solution according to the invention, a further approach to achieving the object stated at the outset provides that the axially acting locking unit has a central receptacle carrier, which has at least one locking receptacle that is radially outward relative to the pivot axis, the central receptacle carrier being connected to the pivot element to be non-displaceable in the direction of the pivot axis and being movable together with the pivot element in the direction of the pivot axis, that the locking unit has at least one locking element, which is situated in a space around the receptacle carrier and may be brought into a locked position that acts on the locking receptacle for holding same in the fixed position, that the locking unit has a guide member which is connected to the pivot bearing base and which has at least one guide for the at least one locking element, the guide specifying a direction of movement for the at least one locking element for a movement between the locked position and a released position, that the locking unit has an actuating element which acts on the at least one locking element from a side opposite from the receptacle carrier, and that by means of the actuating element, a movement of the locking element from the released position into the locked position may be produced, or a movement of the locking element from the locked position into the released position may be enabled.

The advantage of this solution is that by providing the central receptacle carrier, a simple design approach is afforded by means of which the pivot element is fixable in the fixed position, the solution according to the invention of having the central receptacle carrier having the advantage of very small installation space requirements.

The receptacle carrier may be formed in such a way that the locking element interacts with the locking receptacle only in the locked position, or just before reaching this position.

One advantageous approach provides that the locking receptacle is provided with a pull-in surface on which the locking member may act before reaching the locked position for pulling the receptacle carrier, and thus the pivot element, into the fixed position.

It is particularly advantageous if the pull-in surface is extended far enough that the locking element is able to act on same in the released position, in particular if, in the released position, the pull-in surface is acted on in the direction of the locked position, so that by means of the locking element it is possible to pull the receptacle carrier into the fixed position starting from the pivot position, and it is also possible, in the pivot position, to have a pulling-in force act on the receptacle carrier.

For stable locking, it is preferably provided that the central receptacle carrier has at least two locking receptacles, that at least two locking elements are situated in the space around the central receptacle carrier, and that the guide member has at least two guides for the at least two locking elements.

It is thus possible for the receptacle carrier to be acted on, via the locking elements, by forces which act rotationally symmetrically or substantially rotationally symmetrically with respect to the pivot axis.

For example, for two locking elements it is possible to arrange them opposite one another, or for three locking elements, to arrange them at an angular distance of 120° relative to one another.

It is particularly advantageous if the forces from the locking elements acting on the receptacle carrier substantially or completely cancel each other out, so that the receptacle carrier is easily held centrally with respect to the pivot axis, even when acted on by the locking elements.

Heretofore, no further detailed information has been provided with regard to the actuating element.

Thus, for example, it would be conceivable to arrange the actuating element for one or for a plurality of locking elements in such a way that the actuating element is movable in the radial direction relative to the pivot axis, or in such a way that the actuating element is movable in the direction parallel to the pivot axis.

However, it is particularly advantageous, in particular to achieve a small installation space, if the actuating element is pivotable about the pivot axis and has at least one actuating surface sequence which includes a surface area that is most outward in the radial direction and a surface area that is most inward in the radial direction, and that the at least one locking element is in its released position when it engages against the surface area which is most outward in the radial direction, and is in its locked position when it engages against the surface area which is most inward in the radial direction.

In the case of at least two locking elements, it is preferably provided that the actuating element radially outwardly encloses the receptacle carrier and the at least two locking elements.

In particular, an advantageous approach provides that the actuating element has a ring-shaped actuating surface member on which the at least one actuating surface sequence is situated.

In principle, it would be conceivable to actively move the actuating element, for example by means of a drive.

To achieve a manually actuatable but secure positioning of the actuating element, it is preferably provided that the actuating element is continually acted on in the direction of its locked position by an elastic energy store. This has the advantage in particular that when it is not actuated, the locking unit automatically goes from any position into the locked position, in particular a clamped position thereof.

This approach has the advantage that a movement of the actuating element in the direction of the released position against the action of the elastic energy store results, so that when the actuating element is not actuated, it always goes automatically into the locked position and thus moves the locking elements into the locking receptacles, so that the system always automatically goes into a secure, namely, locked, state, provided that the pivot element has reached the fixed position.

To be able to achieve further securing of the actuating element in the locked position, it is preferably provided that by means of a securing unit, the actuating element is fixable in its locked position against a movement into its released position.

With regard to the explanation of the individual exemplary embodiments heretofore, the manner in which the actuating element is to be actuated has not been addressed in detail.

For example, it would be conceivable for the actuating element to be directly acted on, whether by a drive or by a manual actuating device.

However, it is particularly advantageous if the actuating element is actuatable via a rotary drive element which is movable from a starting position into a driving position.

This type of rotary drive element opens up the possibility for indirectly acting on the actuating element, and thus, for example, ensuring that the actuating element is always able to go into its locked position.

In addition, a rotary drive element allows actuation of the securing unit.

It is thus preferably provided that the securing unit is movable by the rotary drive element from an unsecured position into a secured position.

For example, it is thus possible for the rotary drive element to allow a transition of the securing unit into the unsecured position no later than when the actuating element is actuated for moving same from the locked position into the released position.

It is particularly advantageous if the rotary drive element transfers the securing unit into the unsecured position even before the actuating element is acted on, so that when the actuating element is acted on, it is movable without obstruction by the securing unit.

The securing unit is preferably formed in such a way that it includes a securing element which is acted on in the direction of its unsecured position by an elastic energy store, so that the rotary drive element acts on the securing element in such a way that the securing element goes into the secured position when it is acted on by the rotary drive element, and when the rotary drive element moves appropriately, the securing element is able to go into the unsecured position due to the elastic energy store.

When a rotary drive element is provided, in order to ensure that the rotary drive element always moves into its starting position in which it in particular holds the securing unit in the secured position, it is preferably provided that the rotary drive element is acted on by an elastic energy store in the direction of a starting position.

In the starting position, the rotary drive element allows the actuating element to freely pivot in the direction of its locked position, the allowed pivot movement of the actuating element, depending on the design of the actuating surface sequence, including free movement of the actuating element in the direction of a locked position, and in particular in the locked position in the direction of a clamped position in which the actuating element acts in a clamping manner on the locking element together with the respective locking receptacle and the respective guide.

To ensure that the locking unit not only securely locks the pivot element in the fixed position, but also causes the pivot element to go from the fixed position into the pivot position when the locking unit is in its released position, it is preferably provided that the axially acting locking unit has a push-out unit which acts axially in the direction of the pivot position.

This type of push-out unit may be formed in a variety of ways.

The push-out unit preferably includes a push-out element, acting in the direction of the pivot axis, by means of which the pivot element is displaceable from the fixed position into the pivot position.

Such a push-out element is implemented, for example, in such a way that it acts, for example via an inclined surface, on a pressure absorption element that is coupled to the pivot element.

In particular, it is provided that the push-out element together with the pressure absorption element moves the pivot element from the fixed position into the pivot position if the at least one locking element is able to reach its released position, i.e., in particular the actuating element is then in its released position.

With regard to the fixing of the movements of the locking element, it has been explained that the fixing is to take place by means of the guide of the guide member.

Heretofore, no further detailed information has been provided with regard to supporting the locking element in particular in the locked position.

Thus, an advantageous solution provides that in the locked position the locking element is supported on the guide, and may thus be pushed into the locking receptacle while being supported on the guide, so that in the locked position it is possible to clamp the receptacle carrier relative to the guide member by means of the locking element, so that the receptacle carrier may be held relative to the guide member by the locking element, which in its locked position is acted on by the actuating element.

Heretofore, no further detailed information has been provided with regard to the design of the guides on the guide member.

In principle, it would be conceivable to form the guide in such a way that it is implemented by a hole or a closed channel in the guide member.

A particularly advantageous approach, in particular which is simplified with regard to manufacture and assembly, provides that the at least one guide is formed by a recess in the guide member.

This type of recess has a groove-like design, for example, and has oppositely situated side walls and a recess base which guide the locking element, preferably in the intended direction of movement.

The recess is formed in such a way that in the locked position of the locking element in which it engages with the locking receptacle, the locking element is supported on a base of the recess, and thus, in the locked position, on the one hand engages against the base of the recess, and on the other hand engages in the locking receptacle, and is also acted on by the actuating element in the direction of the locked position.

It is thus possible to clamp the receptacle carrier relative to the guide member by pushing the locking element into the locking receptacle while supporting same on the base of the recess.

For the production of the recess and the assembly of the pivot bearing unit, it is particularly advantageous for the recess to be open on a side facing away from the guide member.

Heretofore, no further detailed information has been provided with regard to the design of the guide member and the fixing unit and connecting same to one another.

Thus, an advantageous solution provides that the guide member and a stationary positive-fit element carrier of the fixing unit are connected to one another.

It is particularly advantageous if the guide member and the positive-fit element carrier form an integral part.

An approach which is particularly advantageous for production provides that the guide is situated on a side opposite from the positive-fit elements of the stationary positive-fit element carrier.

Furthermore, as an alternative or in addition to the solutions described heretofore, another advantageous solution to the problem stated at the outset provides that the pivot element has a central pivot bearing member which is mounted in a pivot member bearing seat in the pivot bearing base that radially outwardly encloses the central pivot bearing member so as to be pivotable about the pivot axis, and which is mounted so as to be displaceable between the pivot position and the fixed position in the direction of the pivot axis.

Providing this type of central pivot bearing member for pivotably mounting the pivot element also has the advantage that a very small and space-saving design of the pivot bearing unit is thus possible, since the pivot bearing member itself may be implemented so that it is free of additional elements installed in the pivot bearing member.

For example, in this type of design of the pivot bearing unit, it may be provided that the pivot bearing member carries a central receptacle carrier of the axially acting locking unit which has at least one locking receptacle, the central receptacle carrier being connected to the pivot bearing member so that it is not displaceable in the direction of the pivot axis.

In this case, the locking unit may preferably be implemented in such a way that at least one locking element of the axially acting locking unit is situated in a space around the receptacle carrier, the locking element being guided in a guide of a guide member which is supported on the pivot bearing base, and being engageable or disengageable with the at least one locking receptacle by means of an actuating element situated on a side of the locking element facing away from the receptacle carrier.

This type of approach is particularly compact, and allows the locking unit to be easily integrated into the pivot bearing unit.

In this case, the pivot bearing member and the receptacle carrier are preferably fixedly connected to one another.

It is particularly advantageous if the pivot bearing member and the receptacle carrier form an integral part.

In the explanation of this solution heretofore, no further detailed information has been provided with regard to the arrangement of positive-fit elements of the fixing unit.

Thus, an advantageous solution provides that a stationary positive-fit element carrier of the fixing unit is situated radially outwardly in a region of the pivot bearing base which extends around the pivot bearing member.

The advantage of this approach is that a sufficiently stable rotationally fixed support of the pivot element in the fixed position relative to the pivot bearing base is thus possible.

It is also preferably provided that a positive-fit element carrier which pivots together with the pivot element is fixedly connected to the pivot bearing member.

The co-pivoting pivot element support is preferably fixedly connected to a pivot bearing member head.

In the simplest case, the co-pivoting positive-fit element carrier is integrally formed onto the pivot bearing member head.

Heretofore, no further detailed information has been provided with regard to actuation of the trailer coupling according to the invention.

For example, it is conceivable to actuate the locking unit manually, in particular a manual action being carried out on the rotary drive element.

Another advantageous approach provides that the locking unit is actuatable by an actuating motor.

However, this type of actuation by an actuating motor occurs only in the sense that the locking unit is transferred into the released position, and then by means of the actuating motor, the actuation is once again adjusted, so that the locking unit automatically once again goes from the released position into the locked position, in particular into the clamped position.

For this purpose, the locking unit is provided with a separate energy store, in particular an elastic energy store, which for the transition from the released position into the locked position generates energy, and the actuating motor then also acts against this energy store for the transition from the locked position into the released position.

Using this type of approach, it is possible to provide an electrically actuatable trailer coupling, whereby, for example, the pivoting of the ball neck may also take place manually.

As an alternative or in addition to the motorized actuation of the trailer coupling according to the invention, it is provided that the pivot element is pivotable between the drive position and the rest position by means of a swivel motor, so that in this case manual pivoting is no longer necessary, and instead, this pivoting is carried out by the swivel motor, which, however, is required only for the pivoting movement.

Further features and advantages of the invention are the subject matter of the following description and the illustration of several exemplary embodiments in the drawings.

BRIEF DESCRIPTION OF THE DRAWINGS

FIG. 18 shows a section corresponding to FIG. 7 with a partially cut-away inner bearing portion;

FIG. 19 shows a perspective view of a second exemplary embodiment of a trailer coupling according to the invention; and FIG. 20 shows a section along line A-A in FIG. 19.

DETAILED DESCRIPTION OF THE INVENTION

Figure 1:
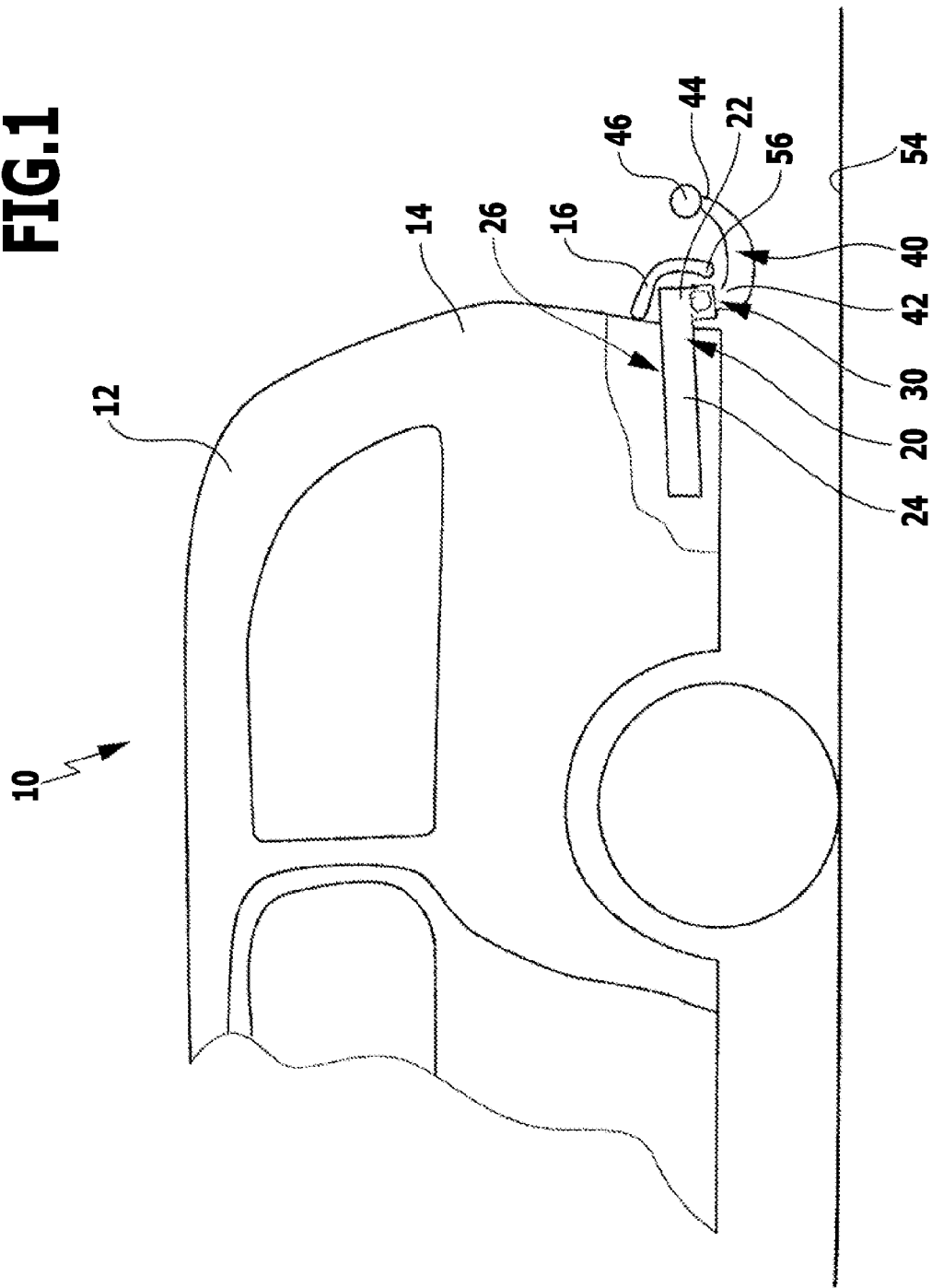
FIG. 1 shows a side view, in a partial cross-section in a rear region, of a motor vehicle having a trailer coupling according to the invention.

A motor vehicle illustrated in FIG. 1 and denoted as a whole by reference numeral 10 includes a vehicle body 12 on which a trailer coupling 20 according to the invention is mounted at a rear region 14, the trailer coupling having a crossmember 22 which is covered by a bumper unit 16 and extends transversely with respect to a longitudinal direction of the vehicle body 12 and transversely with respect to the rear region 14, and having side members 24 extending in the longitudinal direction of the vehicle body 12 along body wall portions and fixed thereto, which together with the crossmember 22 form a mounting unit 26 which is covered in part by the vehicle body 12 and in part by the bumper unit 16.

Figure 2:
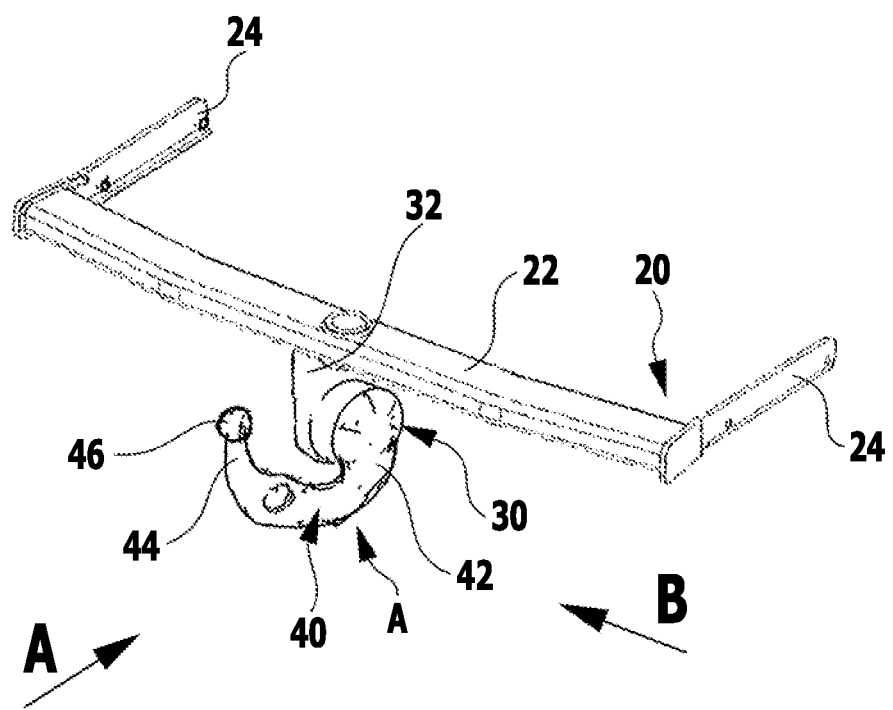
FIG. 2 shows a perspective illustration of a trailer coupling according to the invention, including a mounting unit, a pivot bearing unit, and a ball neck which is pivotably connected to the mounting unit by the pivot bearing unit.

A mounting plate 32 of a pivot bearing unit, denoted as a whole by reference numeral 30, is provided on the mounting unit 26, a first end 42 of a ball neck, denoted as a whole by reference numeral 40, being connected to the mounting plate, the ball neck also carrying a coupling ball, denoted as a whole by reference numeral 46, at a second end 44, as illustrated in FIGS. 1 and 2.

Figure 3:
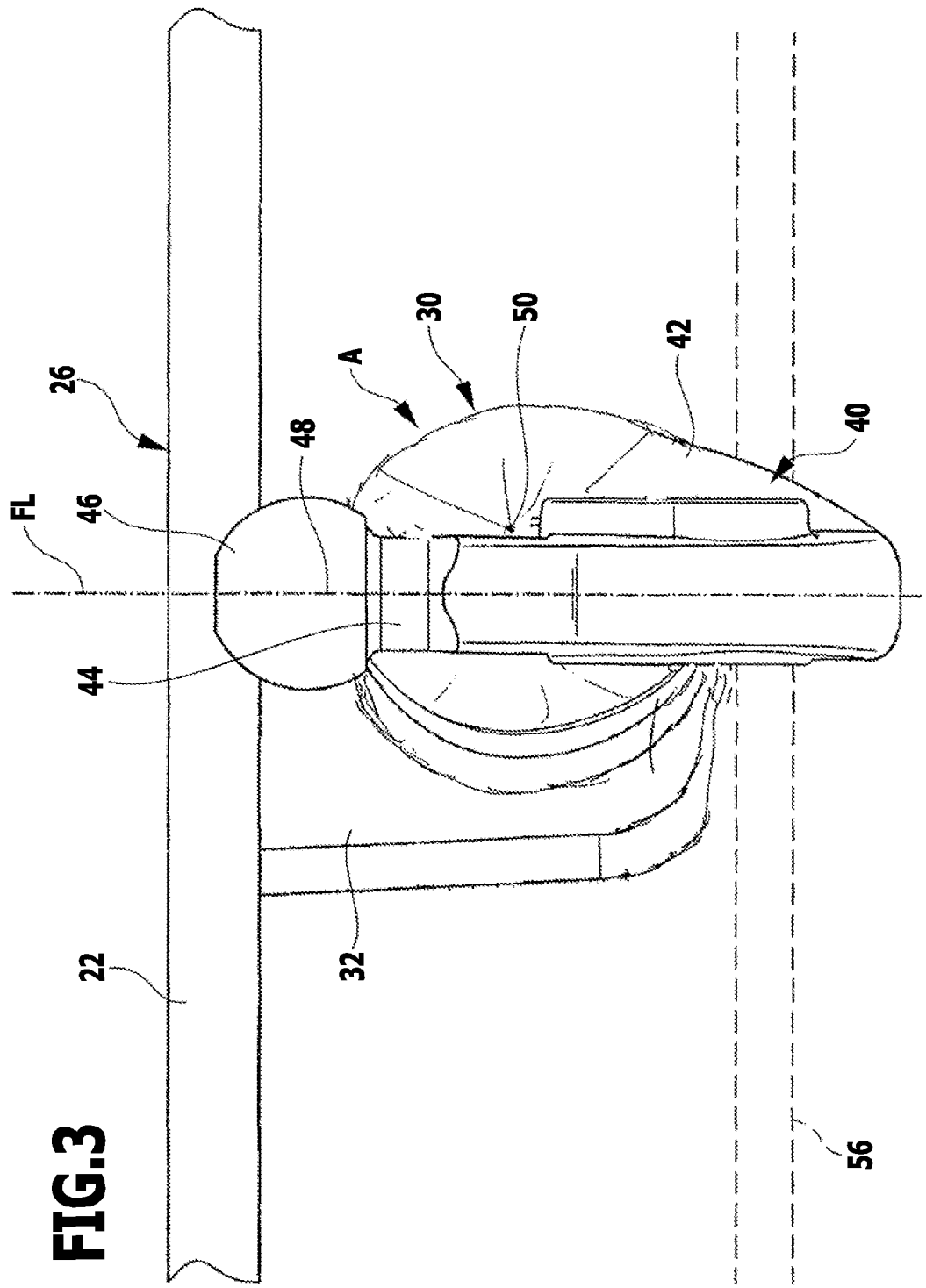
FIG. 3 shows an enlarged view of the trailer coupling according to the invention in the direction of the arrow A in FIG. 2, in a working position.
Figure 4:
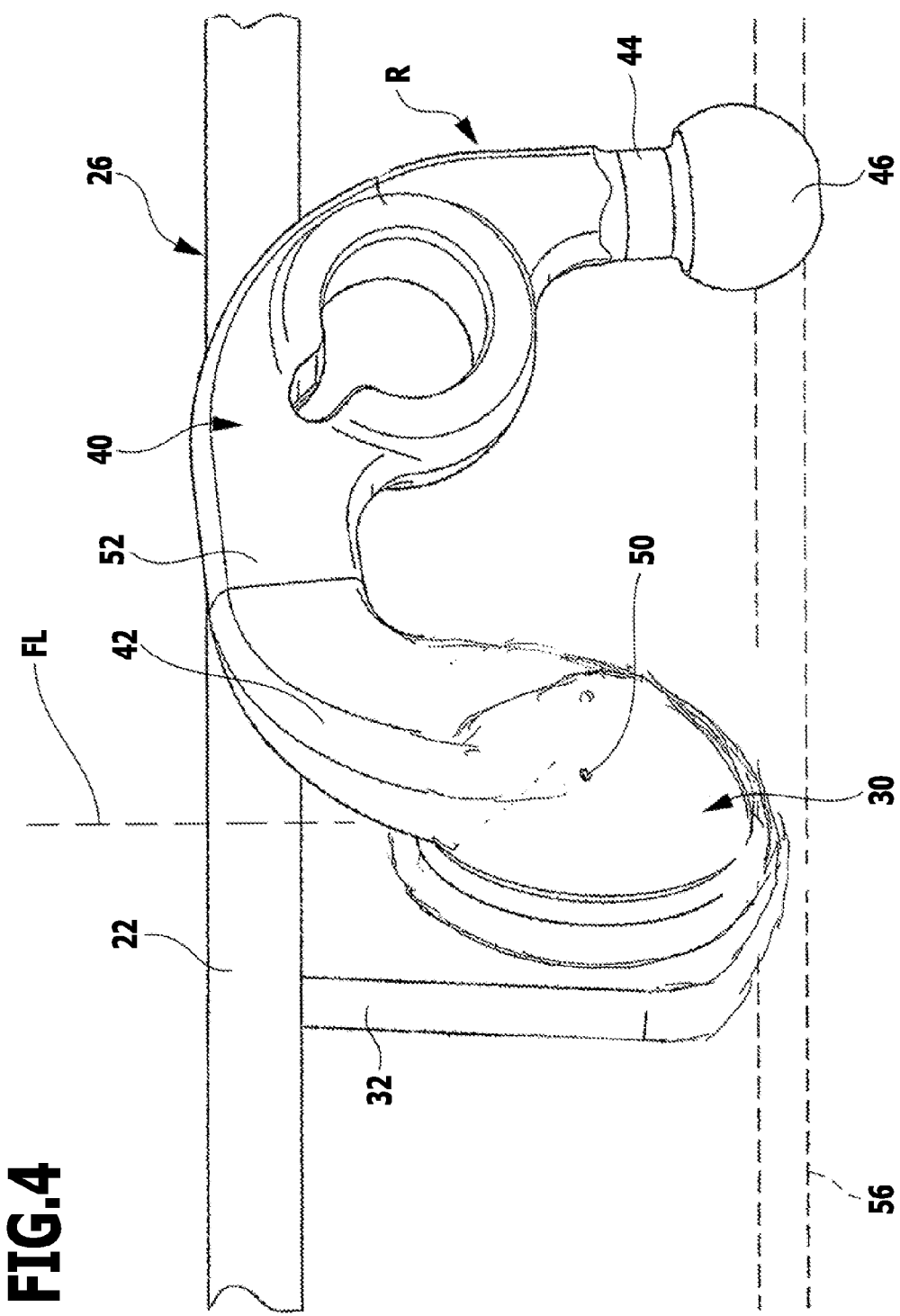
FIG. 4 shows a view corresponding to FIG. 3 in a rest position.

As a result of the pivot bearing unit 30, it is possible to pivot the ball neck 40 from a working position A, illustrated in FIGS. 2 and 3, in which a ball center axis 48 of the coupling ball 46 is situated in a vehicle longitudinal center plane FL, about a pivot axis 50 extending transversely, in particular obliquely, preferably at an acute angle with respect to the vehicle longitudinal center plane FL, into a rest position R, illustrated in FIG. 4, in which a center portion 52 of the ball neck extends transversely with respect to the vehicle longitudinal center plane FL, and the coupling ball 46 is situated to the side of the vehicle longitudinal center plane FL (FIG. 4).

In the rest position R, the ball neck 40 is preferably disposed in a position to the side of the vehicle longitudinal center plane FL and covered by the bumper unit 16 of the vehicle body 12, and, depending on the orientation of the pivot axis 50, the ball neck 40 is situated on a side of the coupling ball 46 facing away from a roadway 54, or the ball neck 40 is situated at least such a distance from the roadway 54 that it is higher from the roadway 54 than a bottom edge 56 of the bumper unit 16.

Figure 5:
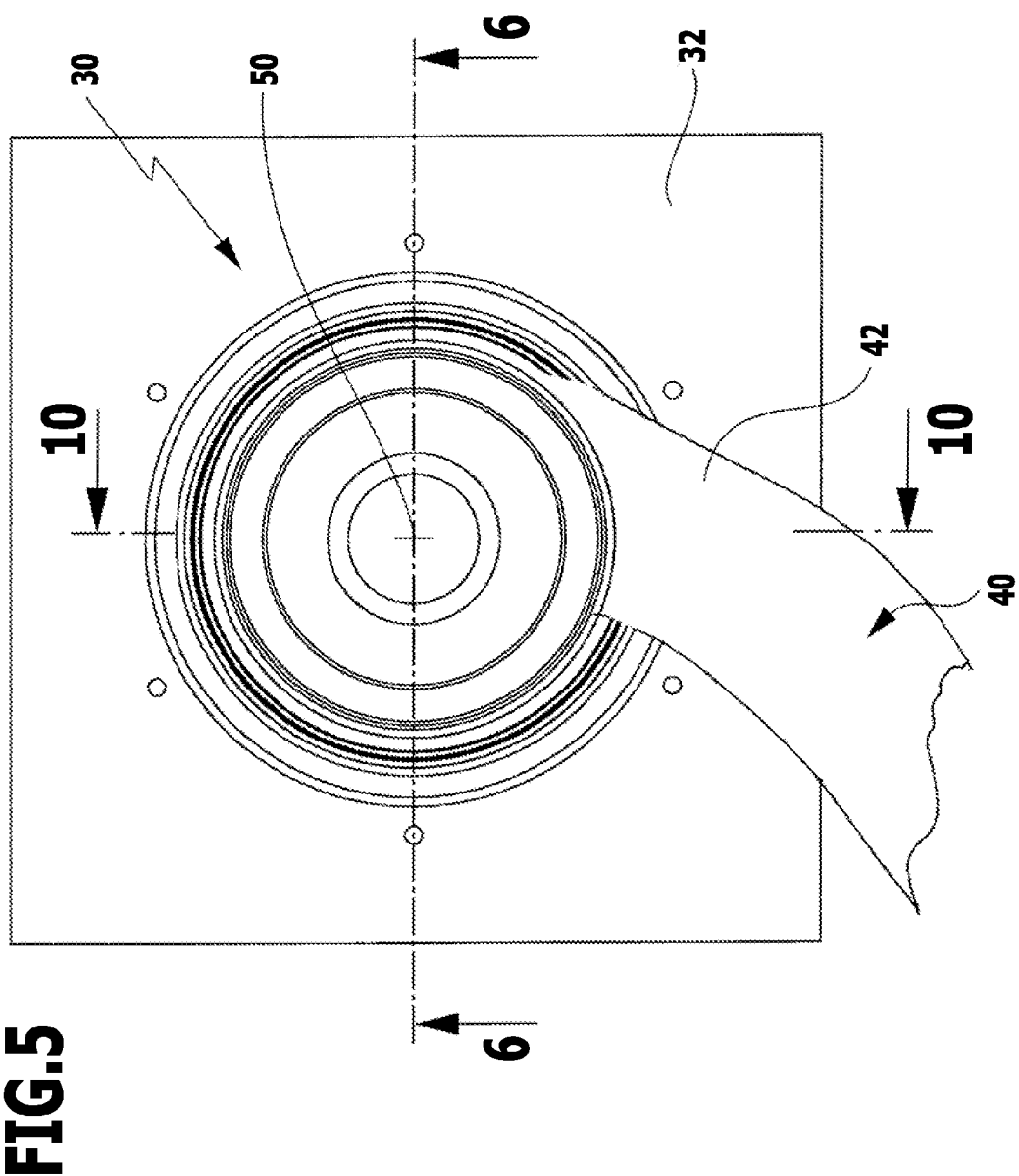
FIG. 5 shows a plan view of the trailer coupling according to the invention in the direction of the arrow B in FIG. 2.
Figure 6:
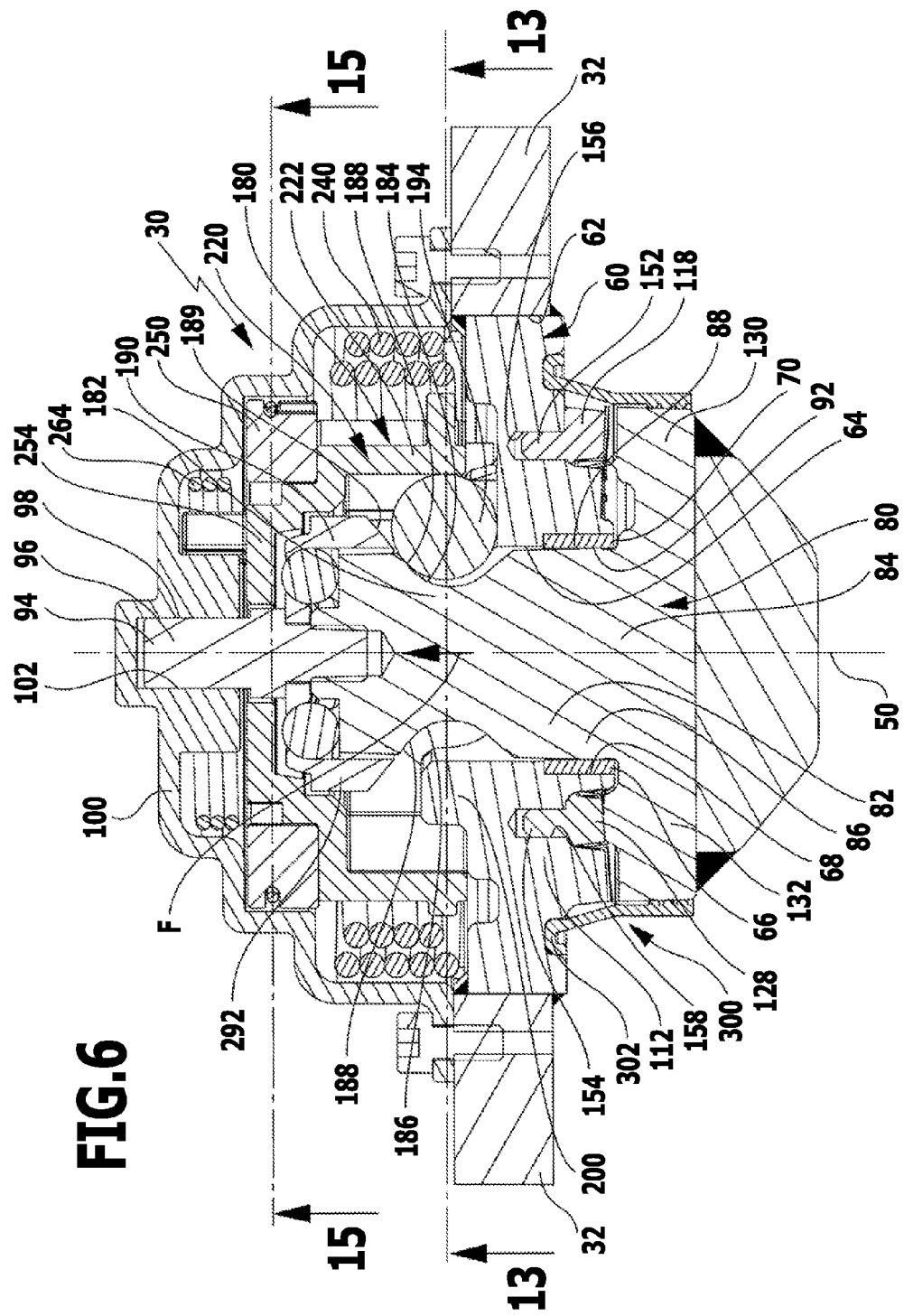
FIG. 6 shows a section along line 6-6 in FIG. 5, through the pivot bearing unit in its fixed position.
Figure 7:
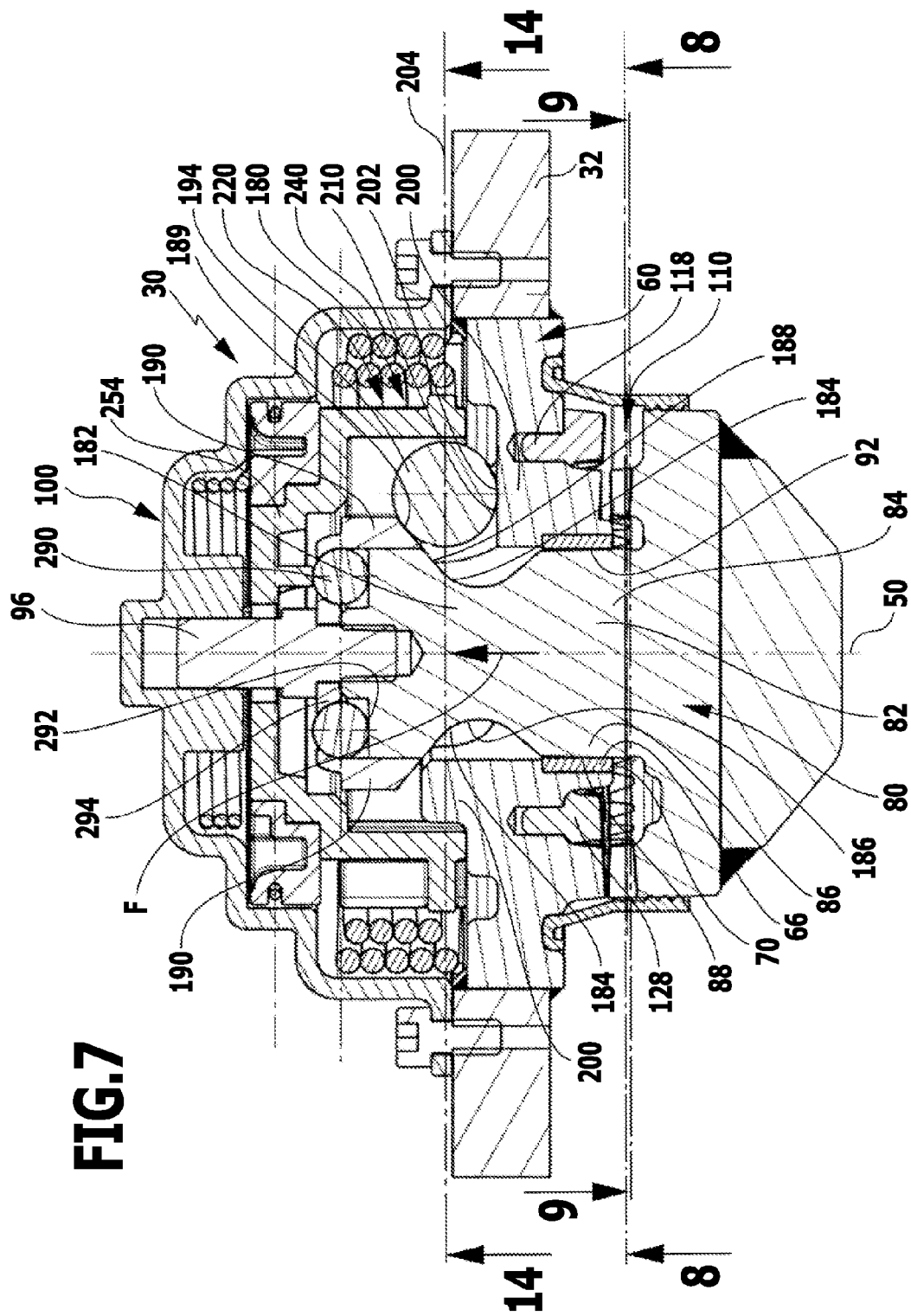
FIG. 7 shows a section along line 6-6 in FIG. 5, through the pivot bearing unit in its pivot position.

As illustrated in FIGS. 5 to 7, the pivot bearing unit, denoted as a whole by reference numeral 30, is situated, for example, on the mounting plate 32 of the mounting unit 26 in such a way that the pivot axis 50 extends perpendicularly with respect to the mounting plate 32, the pivot bearing unit 30 according to the invention extending, for example, on both sides of the mounting plate 32.

However, it is also possible to connect the pivot bearing unit directly to the mounting unit 26.

The pivot bearing unit 30 according to the invention includes a pivot bearing base 60 which, for example, is inserted into an opening 62 in the mounting plate 32 and is connected to the mounting plate 32 by joining, and forms a central passage 64 which, at least in a partial portion, is surrounded by a pivot member bearing seat 66 formed as a sleeve.

The pivot member bearing seat 66, formed as a sleeve, is preferably situated in a recess 68 which is formed in the pivot bearing base 60 and accommodates the pivot member bearing seat 66, and adjoins a front side 70 of the pivot bearing base 60.

A pivot element 80 is pivotable, relative to the pivot bearing base 60, about the pivot axis 50, and has a pivot bearing member 82 which engages in the passage 64 and passes through the passage 64 in the pivot bearing base 60.

In the region of its outer end 84, the pivot bearing member 82 has an outer bearing portion 86 which carries cylindrical outer guide surfaces 88 which cooperate with cylindrical guide surfaces 92 of the pivot member bearing seat 66, so that the cylindrical guide surfaces 88 and 92 are arranged coaxially with respect to the pivot axis 50 and form an outer pivot bearing for the pivot bearing member 82.

Starting from the outer end 84, the pivot bearing member 82 extends through the passage 64, and at its inner end 94 forms an inner bearing portion 96, formed in the shape of a pin, having cylindrical inner guide surfaces 98 which, together with cylindrical guide surfaces 102, likewise form an inner pivot bearing which is coaxially rotatable about the pivot axis 50, the guide surfaces 102 being situated on a housing body 100 that is fixedly connected to the mounting plate 30, and thus also to the pivot bearing base 60.

As illustrated in FIGS. 6 and 7, the pivot element 80 is displaceable in the direction of the pivot axis, from a fixed position illustrated in FIG. 6 into a released position illustrated in FIG. 7, in the released position the pivot element 80 being pushed in the direction of the pivot axis 50 in such a way that the outer end 84 of the pivot bearing member 82 protrudes at least partially beyond the front side 70 of the pivot bearing base 60; i.e., the pivot bearing member 82 as a whole is pushed in the direction of the front side 70.

However, in the pivot position, the pivot bearing member 82 is also guided in the guide surface 102, coaxially with respect to the pivot axis 50, by the inner bearing portion 96, including the inner guide surface 98, and in addition is guided in the guide surface 92 of the pivot member bearing seat 66, coaxially with the pivot axis 50, by the outer bearing portion 86, including the outer guide surface 88.

Thus, the pivot bearing unit 30 according to the invention allows pivoting of the pivot element 80 as well as displacement of the pivot element 80 in the direction of the pivot axis 50, the pivot bearing member 82 being rotatably guided about the pivot axis 50 in the fixed position and also in the pivot position.

The outer guide surface 88 preferably has a larger diameter than the inner guide surface 98, and is guided in the corresponding guide surface 92 by a larger diameter than the inner guide surface 98 is guided in the guide surface 102, so that the outer pivot bearing formed by the outer guide surface 88 and the guide surface 92 is able to absorb greater forces than the inner pivot bearing formed by the inner guide surface 98 and the guide surface 102, in particular the inner pivot bearing primarily representing a guide to prevent the outer guide surface 88 from jamming in the guide surface 92 of the outer pivot bearing.

A fixing unit denoted as a whole by reference numeral 110 is provided for fixing the pivot element 80 relative to the pivot bearing base 60 in a rotationally fixed manner.

Figure 8:
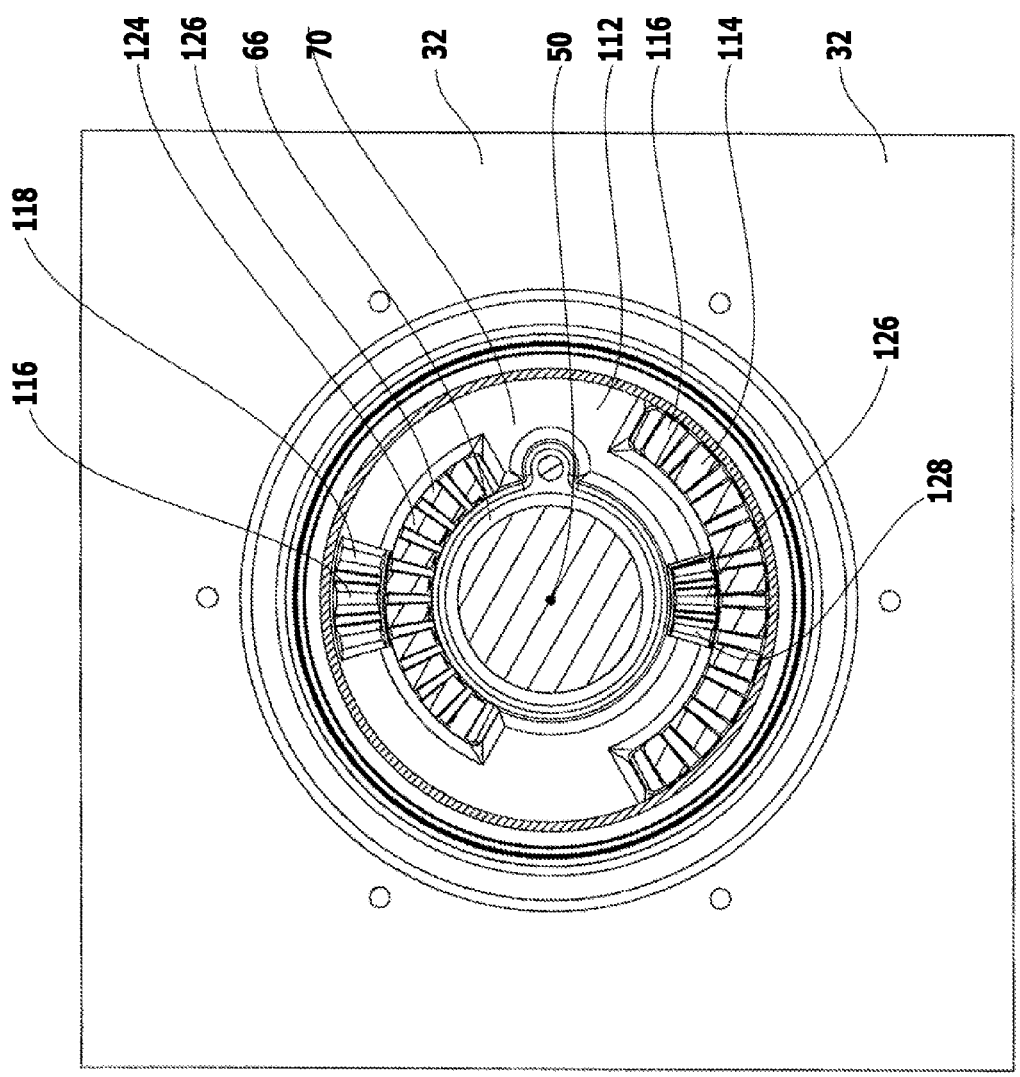
FIG. 8 shows a section along line 8-8 in FIG. 7.

As illustrated in FIGS. 6 and 8, this fixing unit 110 includes a stationary positive-fit element carrier 112 which is situated radially outside the pivot member bearing seat 66 and forms the front side 70 of the pivot bearing base 60, and which, as a positive-fit element, has a radially outward first toothed segment 114 having first teeth 116 which rise above the front side 70, the first toothed segment 114 being provided with a multiplicity of the first teeth 116 which extend around the pivot axis 50, for example over a curved segment of greater than 90°, for example a curved segment of up to 120°.

In addition, a further first toothed segment 118 is provided as a positive-fit element on the positive-fit element carrier 112, and likewise has first teeth 116, but only a few first teeth, for example three such first teeth 116, so that the further first toothed segment extends only over a curved portion that is much smaller than the curved portion of the first toothed segment.

The two first toothed segments 114 and 118 extend about the pivot axis 50 at the same radial distance.

Furthermore, a radially inner second toothed segment 124 is provided on the positive-fit element carrier, for example situated opposite from the first toothed segment 114, and is situated, for example, on the front side 70 between the radially outer further first toothed segment 118 and the pivot member bearing seat 66.

This second toothed segment 124 also has a multiplicity of second teeth 126, and extends over a curved portion of greater than 90°, preferably over a curved portion which corresponds approximately to the extent of the first toothed segment 114.

A further second toothed segment 128 is preferably situated on the stationary positive-fit element carrier 112, opposite from the second toothed segment 124, between the first toothed segment 114 and the pivot member bearing seat 66, and likewise has second teeth 126, but extends over a much smaller curved portion than the second toothed segment 126, and includes three second teeth 126, for example.

The two second toothed segments 114, 118 extend about the pivot axis 50 at the same radial distance, which, however, is smaller than the radial distance of the first toothed segments 124, 128 from the pivot axis 50.

Figure 9:
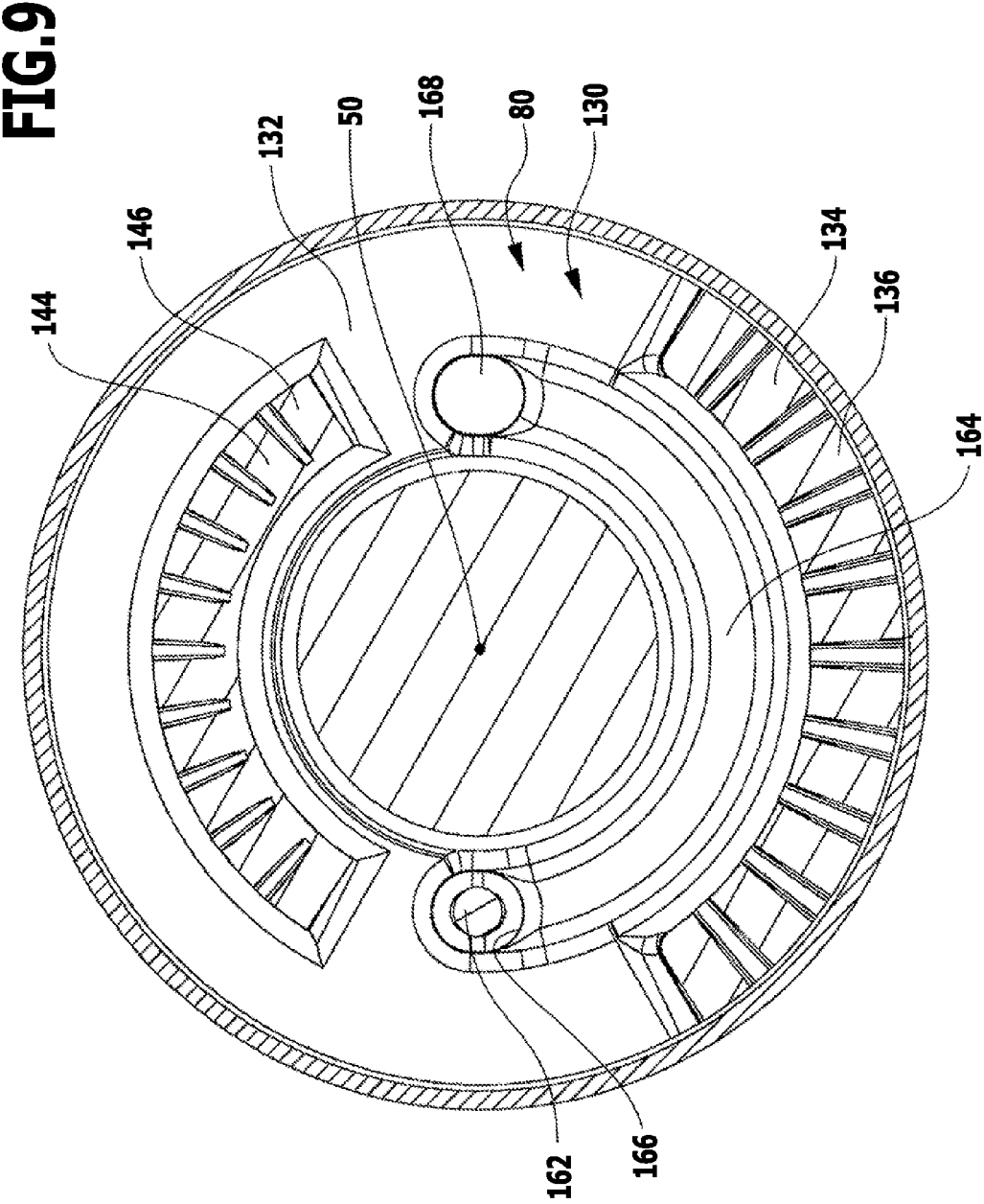
FIG. 9 shows a section along line 9-9 in FIG. 7.

In addition to the stationary positive-fit element carrier 112 having the first toothed segments 114 and 118 and the second toothed segments 124 and 128, the fixing unit 110 includes a movable positive-fit element carrier 132, illustrated in FIG. 9, which is movable together with the pivot element 80, and which is situated on a pivot bearing member head 130 that protrudes radially beyond the pivot bearing member 82 and overlaps the front side 70 of the pivot bearing base 60. The movable positive-fit element carrier 132 has a radially outer first toothed segment 134 having first teeth 136, and a radially inner second toothed segment 144 having second teeth 146, the first toothed segment 134 and the second toothed segment 144 being situated opposite one another relative to the pivot axis 50, and the radial distance of the first toothed segment 134 and the radial distance of the second toothed segment 144 from the pivot axis 50 corresponding to the radial distances of the corresponding toothed segments 114, 118 and 124, 128 of the stationary positive-fit element carrier 112.

For the movable positive-fit element carrier 132, the first toothed segment 134 and the second toothed segment 144 are preferably integrally formed onto the movable positive-fit element carrier 132, and the movable positive-fit element carrier 132 is preferably integrally formed onto the pivot bearing member head 130, so that ultimately, the toothed segments 134 and 144 are integrally joined to the pivot bearing member 82.

In the solution according to the invention, the first toothed segment 114 and the second toothed segment 124 are now situated on the stationary positive-fit element carrier 112, and the toothed segments 134 and 144 are situated on the movable positive-fit element carrier 132, relative to one another and relative to the pivot positions of the pivot element 80, in such a way that in the working position A of the ball neck 40, they are substantially completely engageable with one another; i.e., the first toothed segments 114 and 134 and the second toothed segments 124 and 144 are substantially completely engaged with one another, i.e., substantially with all teeth, when the pivot element 80 moves from the pivot position illustrated in FIG. 7 into the fixed position illustrated in FIG. 6.

On the other hand, if the pivot element 80 in the working position A is moved from the fixed position into the pivot position, the first toothed segments 114 and 134 and the second toothed segments 124 and 144 are disengaged, and the pivot element 80 together with the positive-fit element carrier 132 is freely rotatable about the pivot axis 50 relative to the stationary positive-fit element carrier 112, and thus also relative to the pivot bearing base 60, until the rest position R is reached in which a movement of the pivot element 80, together with the movable positive-fit element carrier 132, from the pivot position into the fixed position results in the first toothed segment 134 of the movable positive-fit element carrier 132 being engaged with the further first toothed segment 118 of the stationary positive-fit element carrier 112, and the second toothed segment 144 of the movable positive-fit element carrier 132 being engaged with the further second toothed segment 128 of the stationary positive-fit element carrier 112, without collisions occurring with the first toothed segment 114 and the second toothed segment 124, so that in the rest position R, the ball neck 40 is likewise fixed relative to the mounting unit 26, and is fixed to the pivot axis 50 in a rotationally fixed manner. However, since in the rest position R, great loads do not occur, and large torques do not act on the ball neck 40, in the rest position R, the further toothed segments 118 and 128 having a few first teeth 116 and second teeth 126 are sufficient to absorb the torques about the pivot axis 50.

Since in the trailer coupling 20 according to the invention, the working position A is always fixed, but, depending on the various models of vehicles, the pivot angle between the working position A and the rest position R may vary, and thus the angular distance between the working position A and the rest position R may vary, in the solution according to the invention, it is preferably provided that the further first toothed segment 128 and the further second toothed segment 118 are flexibly connectable to the stationary positive-fit element carrier 112. As illustrated in FIG. 6 by way of example, the further first toothed segment 118 and the further second toothed segment 128 are provided with retaining pins 152 and 154 which engage with receiving holes 156 and 158 in the stationary positive-fit element carrier 112, and which are thus fixable to same in a positive-fit manner.

For example, the retaining pins 152 and 154 are fixed in the receiving holes 156 and 158 in an integrally joined manner.

Depending on the positioning of the receiving holes 156 and 158 relative to the first toothed segment 114 and the second toothed segment 124, the position of the further first toothed segment 118 and of the further second toothed segment 128 may also be flexibly fixed, according to the particular vehicle model, corresponding to the angular distance between the working position A and the rest position R.

In the exemplary embodiment illustrated in FIGS. 7 to 9, the pivot bearing base 60 together with the stationary positive-fit element carrier 112 and the first toothed segment 114 as well as the second toothed segment 124 represent an integral part, which for cost reasons is manufactured as a cast part, for example.

In addition, in the exemplary embodiment illustrated in FIGS. 6 to 9, the pivot bearing member 82 together with the pivot bearing member head 130 and the movable positive-fit element carrier 132 having the first toothed segment 134 and the second toothed segment 144 likewise represent an integral part which is manufacturable by casting.

Figure 10:
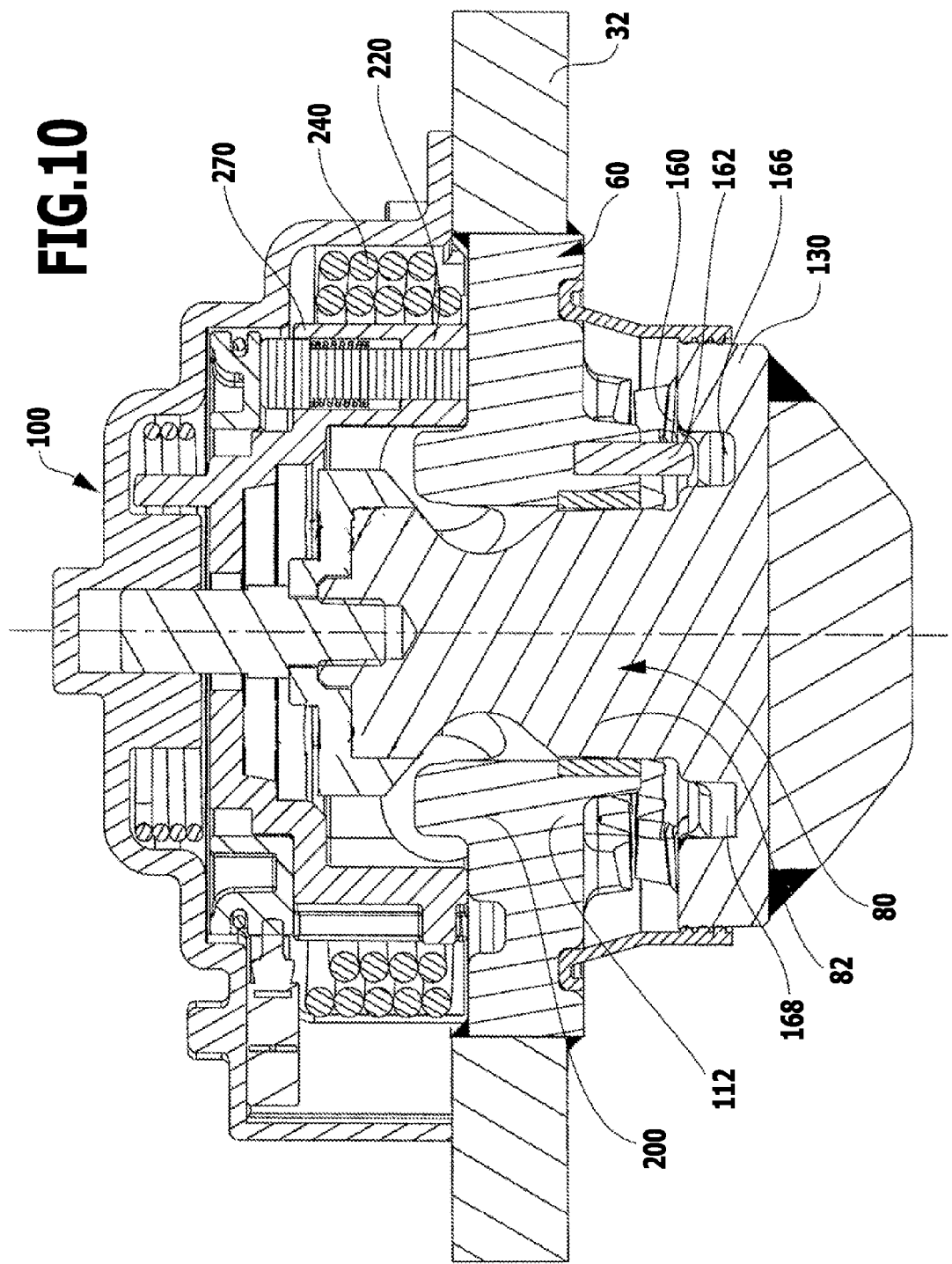
FIG. 10 shows a section along line 10-10 in FIG. 5, in the pivot position.
Figure 11:
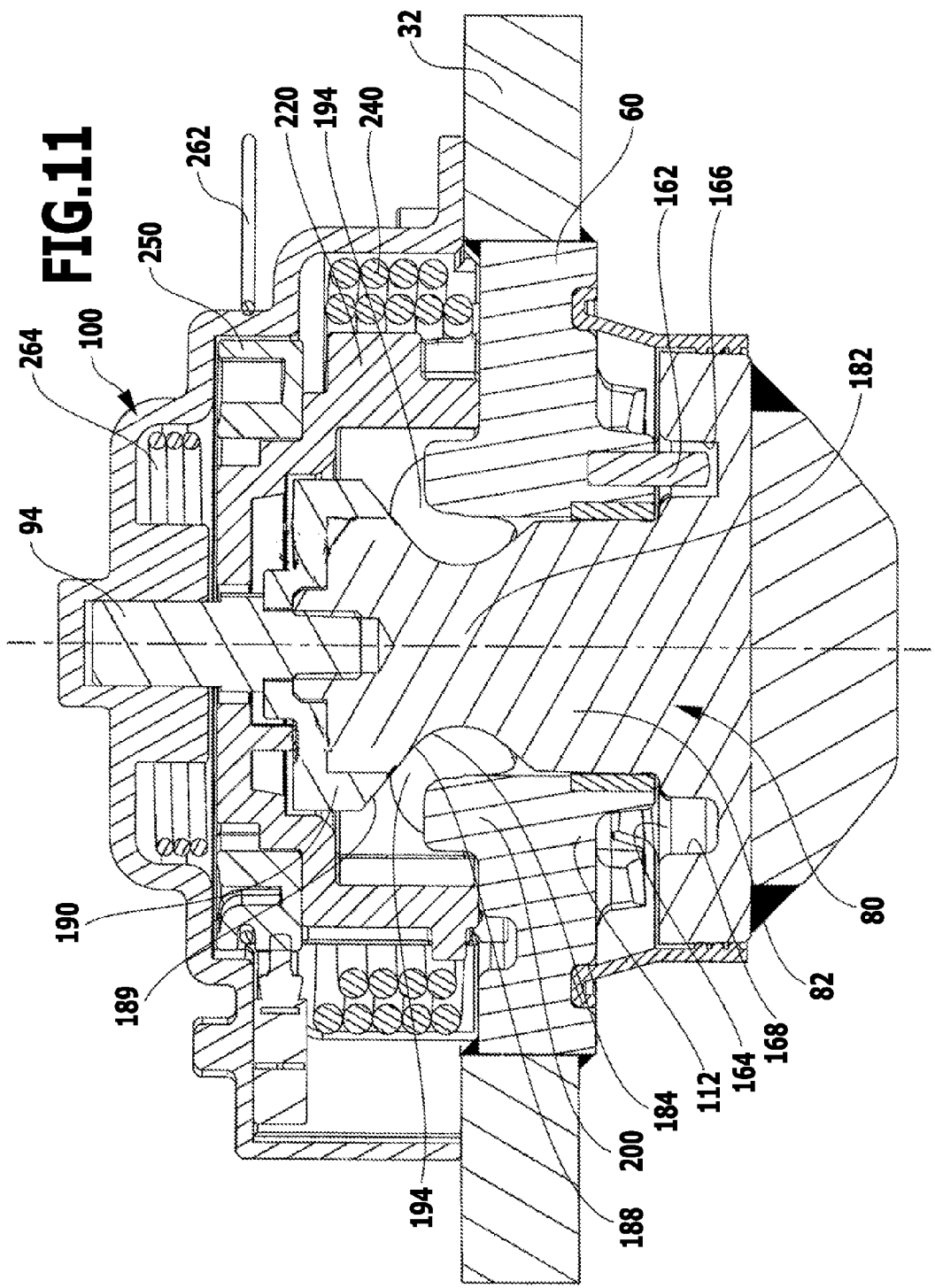
FIG. 11 shows a section similar to FIG. 10, in the fixed position.
Figure 12:
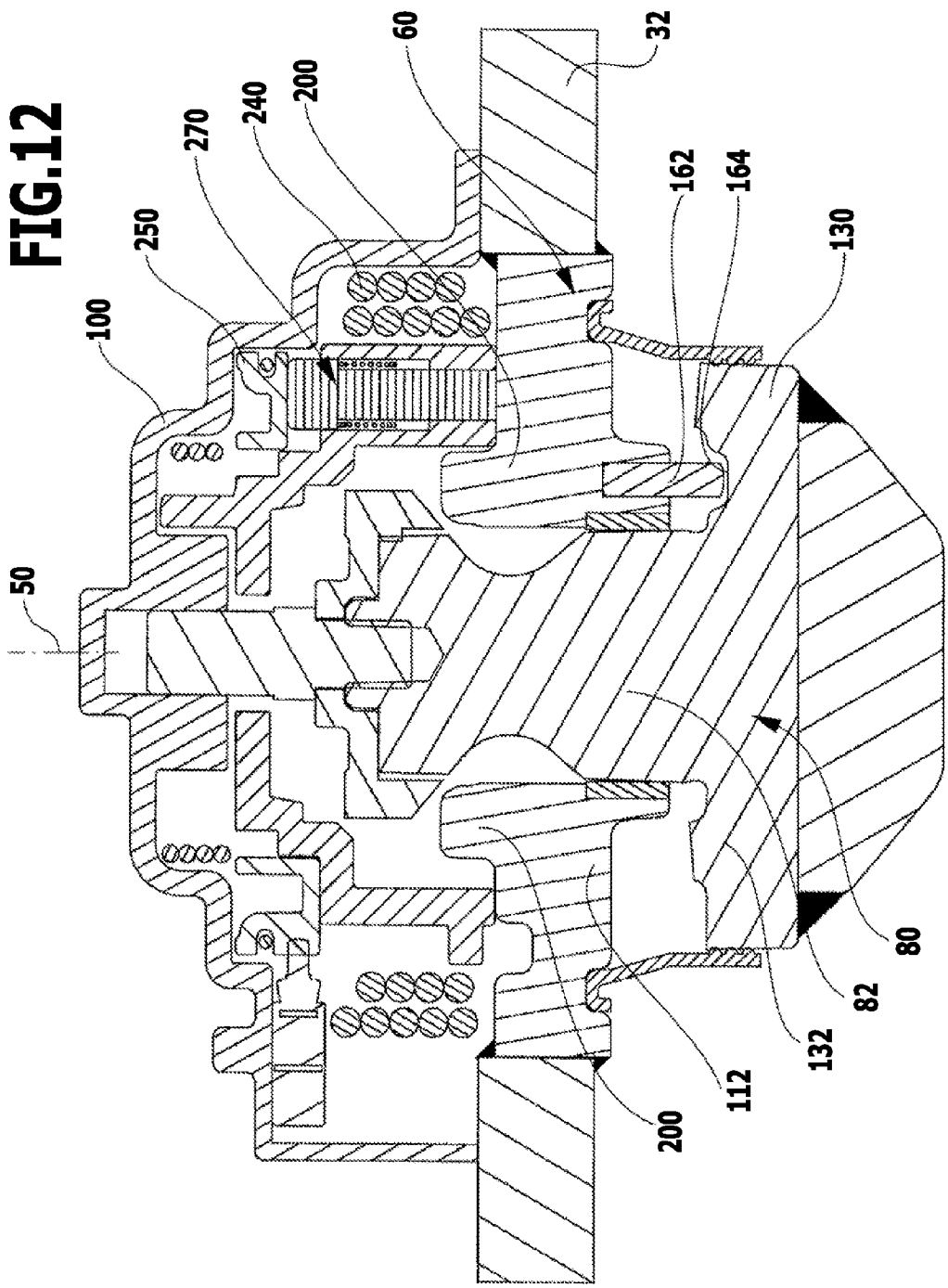
FIG. 12 shows a section in a section plane extending through the pivot axis and through a securing element.

To prevent the toothed segments 114 and 118 from engaging with the toothed segment 134, and the toothed segments 124 and 128 from engaging with the toothed segment 144, in the rotational positions between the working position A and the rest position R when the pivot element 80 is pivoted about the pivot axis 50 relative to the pivot bearing base 60, between the working position A and the rest position R, a fixing block unit 160 is provided which, as illustrated in FIGS. 9 and 10, includes a track follower 162, situated on the stationary positive-fit element carrier 112 and protruding beyond the front side 70 and the toothed segments 114, 118 and 124 and 128, which cooperates with a guide track 164 in the movable positive-fit element carrier 132, which, in the working position A and in the rest position R, transitions into a recess 166 and 168 in which the track follower 162 is able to enter when the working position A and rest position R are reached, whereas when the track follower 162 slides along the guide track 164 between the recess 166 and 168, it prevents the toothed segments 114 and 118; 124 and 128 from engaging with the toothed segments 134 and 144, respectively, as illustrated in FIG. 11.

In order to keep the pivot element 80, and in particular also the stationary positive-fit element carrier 112, engaged with the movable positive-fit element carrier 132 in the fixed position, an axially acting locking unit denoted as a whole by reference numeral 180 is provided, as illustrated in FIGS. 6 and 7 and FIGS. 13 and 14.

The axially acting locking unit 180 includes a central receptacle carrier 182 which is movable together with the pivot element 80, preferably the pivot bearing member 82, in the axial direction with respect to the pivot axis 50, and which in the illustrated exemplary embodiment is preferably integrally formed onto the pivot bearing member 82 and preferably has a plurality of locking receptacles 184, which in this exemplary embodiment are formed, for example, by a circumferential recess 186 in the pivot bearing member 82 which is situated between the outer bearing portion 86 and the inner bearing portion 96; however, individual locking receptacles 184 may also be provided in the central receptacle carrier.

Each locking receptacle 184 has a locking surface 188 which extends at an angle, preferably conically, with respect to the pivot axis 50 and away from the pivot axis 50 as the radial extent increases, and is adjoined by a pull-in surface 189 which extends at the same or a varying inclination with respect to the pivot axis 50 and extends radially beyond the bearing portion 86.

The pull-in surface 189 is situated, for example, at least in part or as a whole, on an annular body 190 which is fitted onto the pivot bearing member 82 and protrudes radially beyond the pivot bearing member.

However, it would also be possible to form the receptacle carrier 182 in such a way that it encompasses the entire radial extension of the pull-in surface 189.

Figure 13:
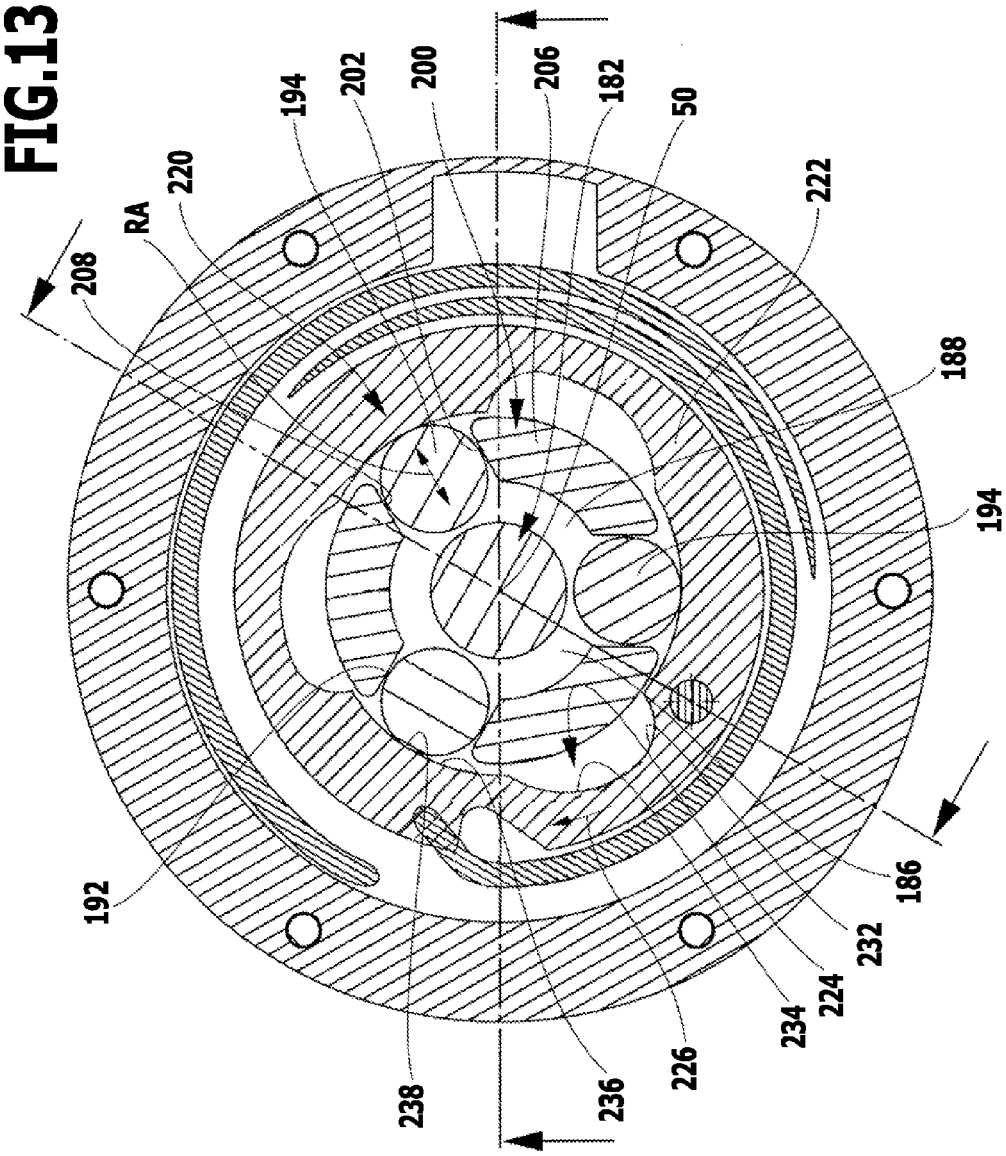
FIG. 13 shows a section along line 13-13 in FIG. 6.
Figure 14:
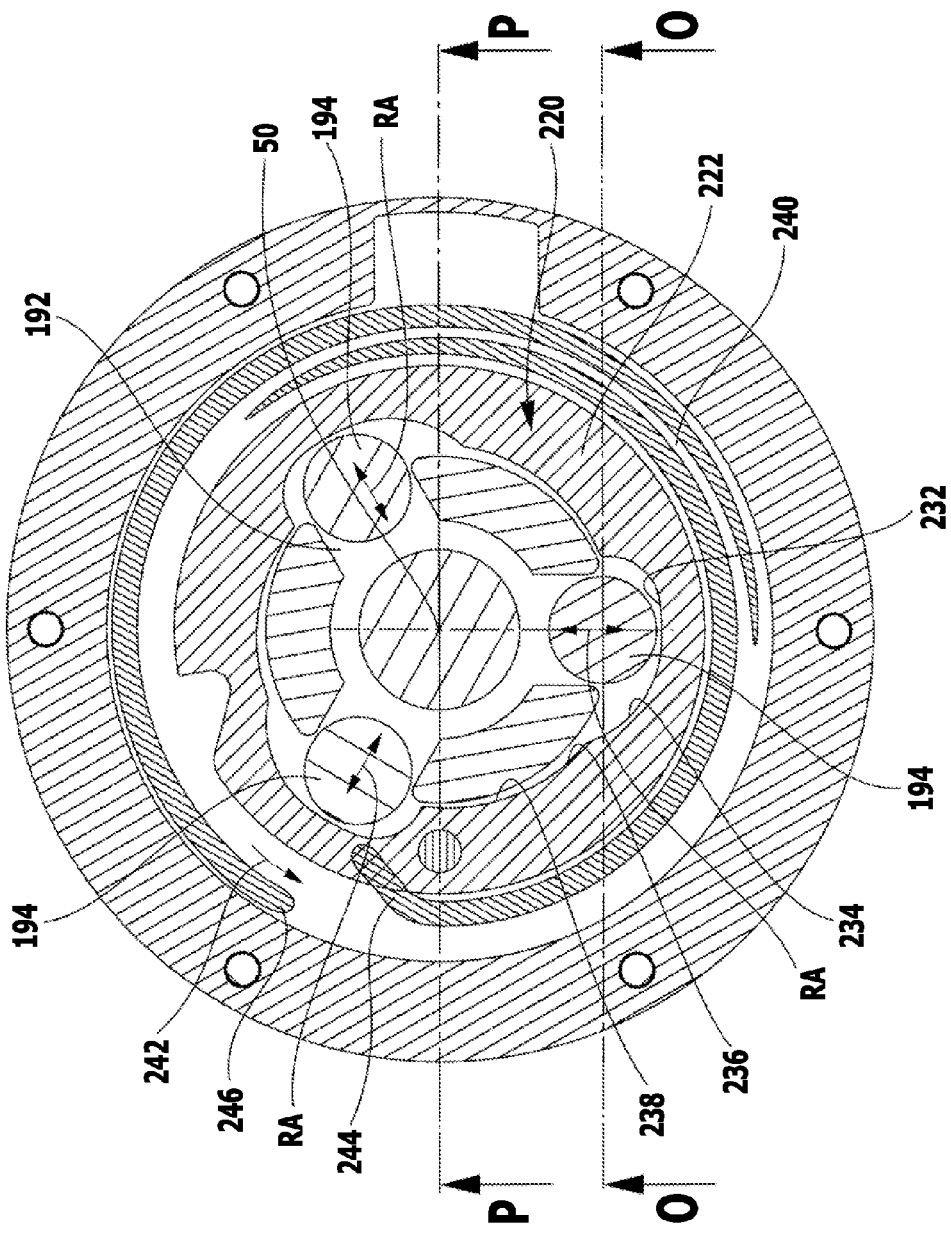
FIG. 14 shows a section along line 14-14 in FIG. 7.

As is apparent in particular from FIGS. 13 and 14, locking elements 194 cooperate with the locking receptacles 184, the locking elements being movable, in a radial direction RA with respect to the pivot axis 50, in a guide member 200 which is connected to the pivot bearing base 60, and in particular being guided in guides 202 of the guide member in such a way that the locking elements are able to move, at least with one component, in the radial direction RA, and are also movable in a plane 204 which extends transversely with respect to the pivot axis 50 and preferably represents a plane perpendicular to the pivot axis 50.

Theoretically, however, the plane 204 could also be formed as a plane extending, at least slightly, conically with respect to the pivot axis 50.

When the locking elements 194 move in the guides 202, action of the locking elements 194 on the pull-in surface 189 when in the released position results in a force F directed parallel to the pivot axis 50 which moves the pivot element 80 from the pivot position in the direction of the fixed position, and thus, in the working position A or the rest position R, brings the toothed segments 114, 118, 124, 128, 134, 144 of the positive-fit element carriers 112 and 132 into engagement with one another, the locking element 194 acting on the locking surface 188 at least when the fixed position is reached.

The guides 202 are preferably formed as groove-like recess situated between ribs 206 which extend from the guide member 200 in the direction of the housing body 100, the ribs 206 in each case forming the side surfaces 208 of the guides 202 between which the locking elements 194 are guided in the radial direction RA, and in addition the guide member 200 forms a guide base 210 on which the locking elements 194 are supported, against a movement in the direction of the pivot axis 50, on the guide member 200 which defines the shape of the plane 204 along which the locking elements 194 are movable in order to engage or disengage with their locking receptacles 184.

Furthermore, for moving the locking elements 194 in the guides 202 in the radial direction RA, an actuating element denoted as a whole by reference numeral 220 is provided that has an actuating surface member 222 which surrounds all locking elements 194 on its radially outer side opposite from the locking receptacles 184, and, for each of the locking elements 194, has an actuating surface sequence 224, extending in a rotational direction 226, that transitions from a radially outer release surface region 232 which, as illustrated in FIG. 14, allows a released position of the particular locking element 194, in which position the locking element does not engage with the locking receptacle 184, into a displacement surface region 234 which follows in the rotational direction 226 and is able to transfer the particular locking element 194 from the released position into a locked position.

The displacement surface region 234 is adjoined in the rotational direction 226 by a clamping surface region 236 which likewise has a radial distance from the pivot axis 50 that decreases with increasing extent in the rotational direction 226, and which is used to move the locking elements 194, which are already in the locked position, in the direction of the locking receptacle 184 provided for same, under a constant or varying, for example increasing, force, until an end surface region 238 of the actuating surface sequence 224 is reached in which the particular locking element 194 acts on the locking receptacle 184 in such a way that in the locked position, the receptacle carrier 182 is held relative to the guide member 200, and the toothed segments 114, 118, 124, 128, 134, 144 of the positive-fit element carriers 112 and 132 are held due to the stationary positive-fit element carrier 112 which is integrally formed onto the guide member 200.

As illustrated in FIGS. 13 and 14, the actuating element 220 has an annular shape in the region of the actuating surface member 222, and is mounted in the housing body 100 so as to be rotatable about the pivot axis 50 in such a way that the surface regions 232, 234, 236, and 238 also extend around the pivot axis 50 in the rotational direction 226 over successive curved segments, and by rotation of the actuating element 220 about the pivot axis 50, various different surface regions 232 to 238 act on the locking elements 194 in order to move same in the guides 202 in the radial direction RA with respect to the pivot axis 50.

To ensure, for example in the manually unactuated state of the trailer coupling according to the invention, that the actuating element 220 always acts on the locking elements 194 in such a way that they have a tendency to move in the direction of the locking receptacles 184 and generate the force F which acts on the pivot element 80, the actuating element 220 is acted on by a torsion spring 240 in the direction of a rotational direction 242, in the sense of a movement from the released position into the locked position or clamped position, so that the actuating element 220 always attempts to act on the locking elements 194 in the direction of the locked position or the clamped position, so that, due to the action of the torsion spring 240 in the unactuated position of the actuating element 220 in the pivot position, the locking elements 194 act on the pull-in surfaces 189, and/or in the fixed position act on the locking surfaces 188, and therefore act on the receptacle carrier 182 with the force F, so that the receptacle carrier has a tendency to engage, and/or hold in engagement, the toothed segments (which may also be referred to as positive-fit elements) 114, 118, 124, 128, 134, 144 of the positive-fit element carriers 112 and 132.

The torsion spring 240 is preferably formed in such a way that it winds around the actuating surface member 222 of the actuating element 220, and at one end 244 engages with the actuating surface member 222 of the actuating element 220, while at the other end 246 it engages with the pivot bearing base 60, and at this end 246 is therefore fixed relative to the pivot bearing base 40.

Figure 15:
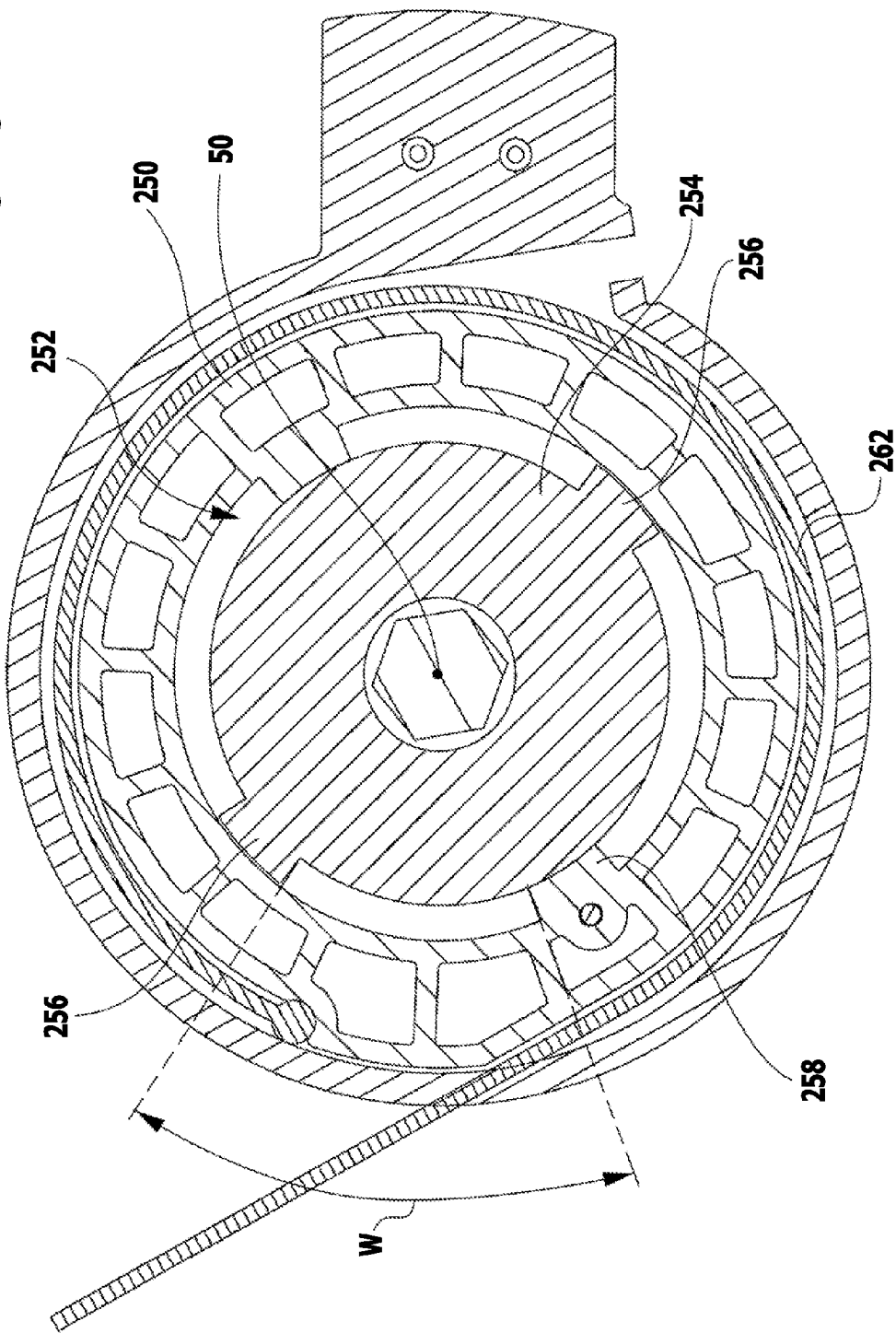
FIG. 15 shows a section along line 15-15 in FIG. 6 in a starting position of a rotary drive element and a locked position of an actuating element.
Figure 16:
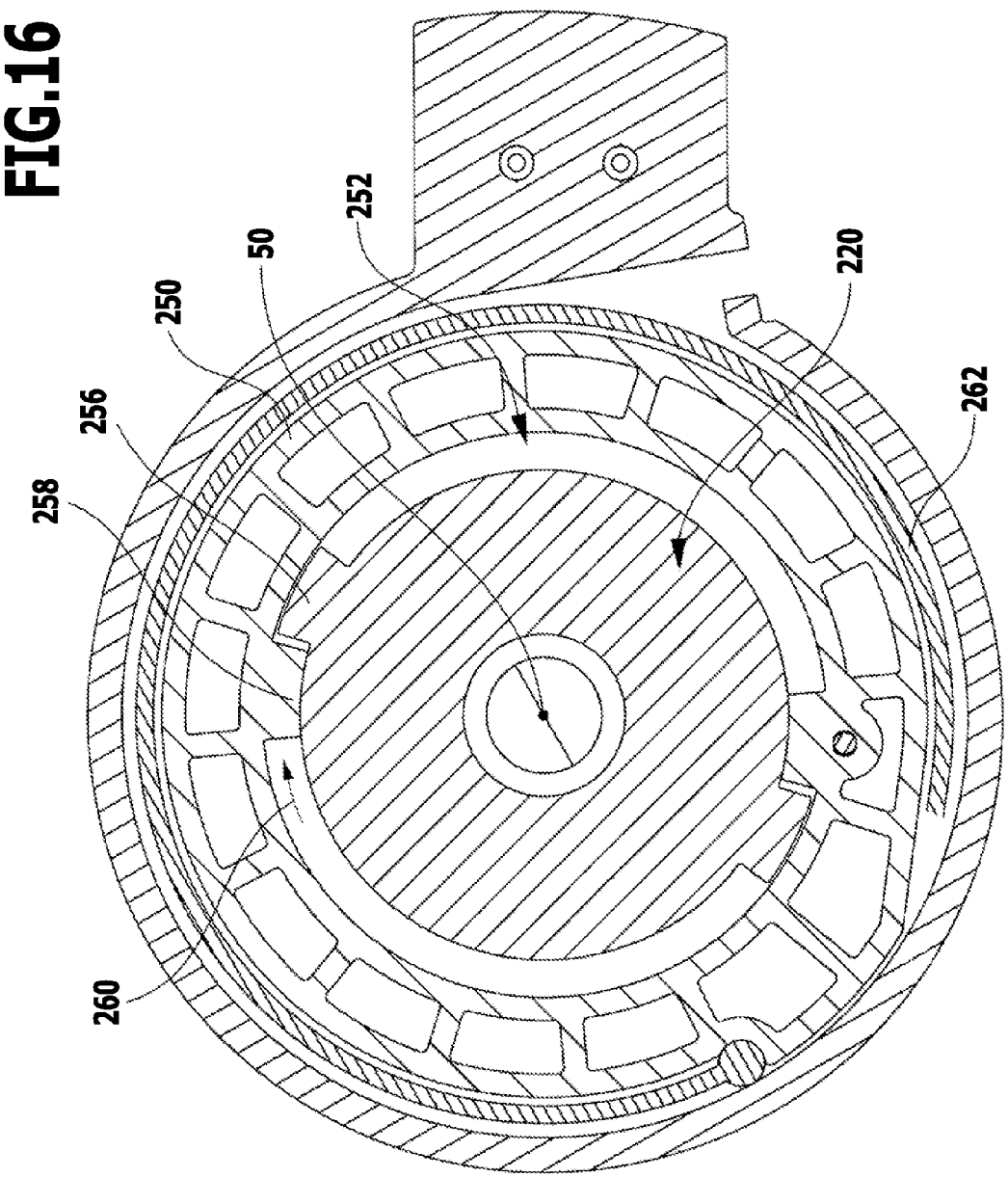
FIG. 16 shows a section similar to FIG. 15 in a driving position of the rotary carrier element and of the actuating element in a transition from the locked position into a released position.
Figure 17:
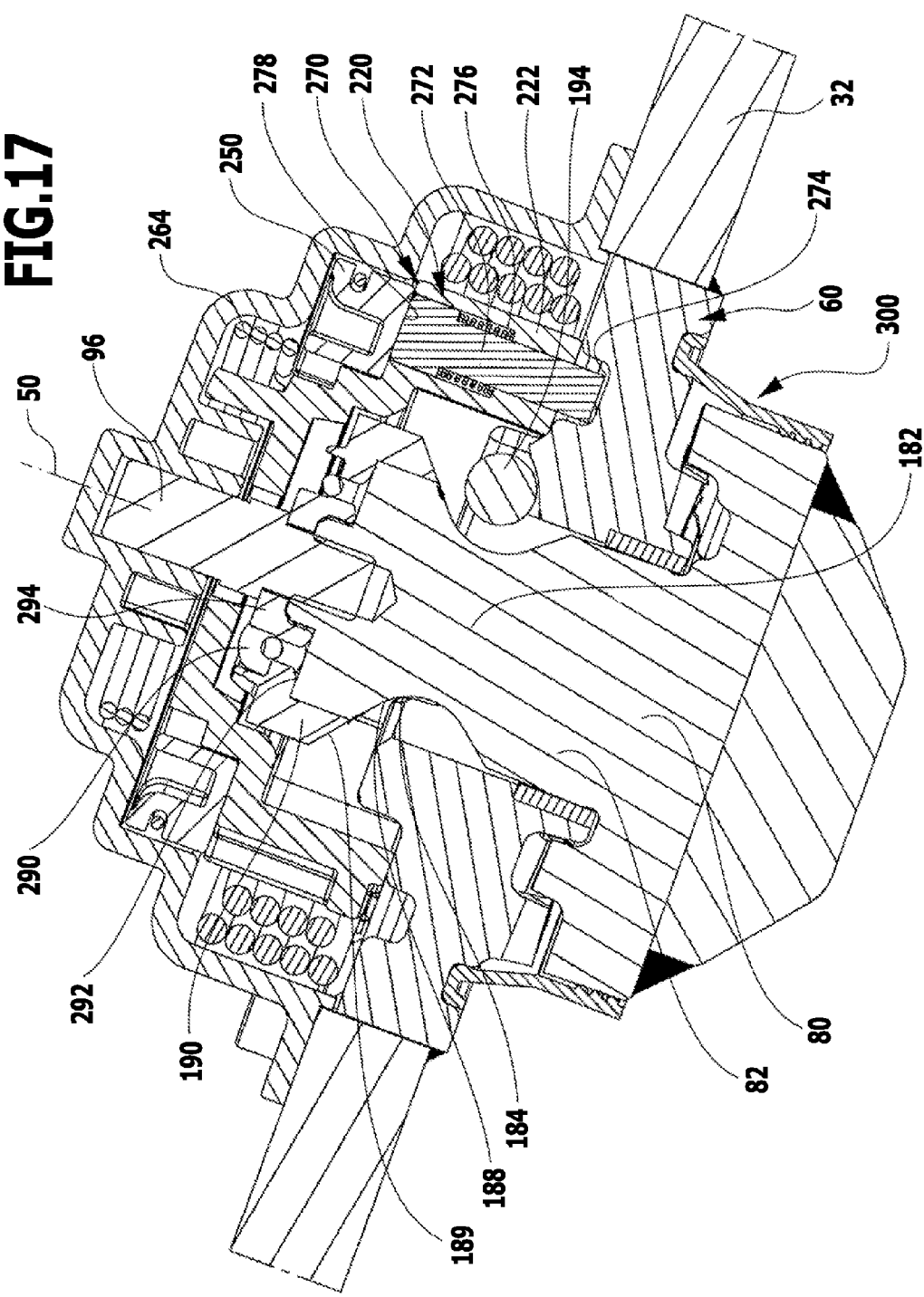
FIG. 17 shows a section in a section plane extending through the pivot axis and extending centrally through a securing element.

To rotate the actuating element 220 against the force of the torsion spring 240, a rotary drive element denoted as a whole by reference numeral 250 is provided which, as illustrated in FIGS. 15 and 16, likewise extends annularly around the pivot axis 50, and can be coupled to the actuating element 220 via an override coupling 252.

For example, the actuating element 220, as illustrated in FIGS. 6 and 7, is provided with a cam 256 on an inner part 254 which is connected to the actuating surface member 222 and is situated on the side of the actuating surface member 222 facing away from the pivot bearing base, whereby the cam may be acted on by a driver 258 of the rotary drive element 250 which projects in the direction of the cam 256, so that the cam 256, and thus also the actuating element 220, is able to co-rotate with the rotary drive element 250.

In the locked position and in particular the clamped position of the actuating element 220, and in the unactuated position, i.e., a starting position of the rotary drive element 250, an angular distance W is present between the driver 258 and the cam 256 of the actuating element 220, as a result of which the actuating element 220 is able to freely move from any of its positions into the locked position, in particular the clamped position, whereby when the rotary drive element 250 is actuated, i.e., turned, initially the actuating element 220 is not carried along, and only after the angular distance W is passed through does the rotary drive element 250 co-rotate with the actuating element 220, in that the driver 258 acts on the cam 256 in the rotational direction 260, and therefore the actuating element 220 also co-rotates.

The rotary movement of the rotary drive element 250 may be initiated, as illustrated in FIGS. 15 and 16, for example, by a pull-wire 262 which acts on the rotary drive element 250.

The rotary drive element 250 may be brought into its starting position illustrated in FIG. 15 by means of a torsion spring 264, while pulling on the pull-wire 262 causes the rotary drive element 250 to turn in the rotational direction 260 opposite to the action of force of the torsion spring 264, so that, beginning from an entraining position, the driver 258 then carries the cam 256 along, thus causing the actuating element 220 to co-rotate.

The override coupling 252 is used to unsecure a securing unit 270, the securing unit 270 being used to prevent the actuating element 220 from rotating out of the locked position.

The securing unit 270 includes a securing element 272 which is displaceably mounted, parallel to the pivot axis 50, in the actuating element, preferably the actuating surface member 222, and which is engageable with the pivot bearing base 60 by means of a securing receptacle 274, and is engaged when the rotation of the actuating element 220 out of one of the possible locked positions, including the clamped positions, into the released position, is to be prevented. For this purpose, the securing element 272 is preferably acted on by a spring 276 in a direction such that the securing element automatically releases from the securing receptacle when the movement of the securing element 272 is enabled.

The action on the securing element 272 in the direction of the securing receptacle 274 and the entry into the securing receptacle 274 are brought about by a slide track 278 on the rotary drive element 250, the slide track 278 allowing the securing element 272 to disengage from the securing receptacle 274, preferably shortly before the actuating element is carried along by the driver 258 which acts on the cam 256, to permit rotation of the actuating element 220.

However, as soon as the rotary drive element 250 is no longer acted on and the rotary drive element 250 has reached its starting position, due to the action of the torsion spring 240, the actuating element 220 has also reached its locked position or clamped position, so that the securing element 272 has been brought into engagement with the securing receptacle 274 by means of the slide track 278, and is held in engagement by the slide track 278.

By means of the securing unit 270, the actuating element is thus additionally secured against releasing on its own.

When the actuating element 220 is transferred from the locked position, in particular the clamped position of the locked position, into the released position, to ensure that not only are the locking elements 194 able to go into their radially outer position in which they abut release surface regions 232, but also that, after the locking elements 194 go into the released position, the pivot element 80, in particular the pivot bearing member 82, is also moved opposite to the direction of the force F in the direction of the pivot axis 50, as illustrated in FIGS. 7 and 18, a push-out unit 280 is provided which has a push-out element 282 that is provided on the inner part 254 of the actuating element 220 and has an inclined surface 284 which includes a region 286 that is situated at a maximum distance from the pivot bearing base 60 and rises up to a region 288 situated at a minimum distance from the pivot bearing base 60, so that when the actuating element 220 rotates, the inclined surface 284 of the push-out element 282 acts on a pressure absorption element 290 which is formed as a sphere, for example, and is situated, for example, in a step-shaped transition region 292 of the pivot bearing member 82 from the region which forms the receptacle carrier 182 into the inner bearing portion 96, and is guided into a cage body 294 connected to the annular body 190 and held by same on the pivot bearing member 82.

If the pressure absorption element 290 is now slid along on the inclined surface 284 from the region 286 to the region 288, this results in an increasing displacement of the pivot bearing member 82, and thus, of the entire pivot element 80, from the fixed position (illustrated in FIG. 6) into the pivot position (illustrated in FIG. 7).

The push-out element 282 having the inclined surface 284 is arranged in such a way that it acts on the pressure absorption element 290, which is located on the pivot element 80, when the actuating element 220 is already rotated far enough in the rotational direction 260 that it releases the locking elements 194 and allows them to go into the released position. The push-out element 282 having the inclined surface 284 then becomes active, and acts on the pressure absorption element 290 in such a way that upon further rotation of the actuating element 220, the pivot element 80 and also the pivot bearing member 82 go from the fixed position into the pivot position as the result of a movement in the direction of the pivot axis 50.

Thus, the push-out unit 280 causes a forced movement of the pivot element 80 and of the pivot bearing member 82 from the fixed position into the released position, thus also resulting in a forced release of the positive-fit elements of the positive-fit element carriers 112 and 132.

To establish a seal between the pivot bearing member 60 and the pivot element 80, a sealing unit 300 is provided on the pivot bearing member 60, for example radially outside the positive-fit element carrier 112, which circumferentially surrounds same and is fixed in a groove 304 in the pivot bearing base 60 by means of a fixing segment 302, and, via a cylindrical shielding segment 306, extends, starting from the fixing segment 302, in the direction of the pivot bearing member head 130, and via a terminating segment 308 which protrudes radially inwardly, carries circumferential ribs 310 in a ring around the pivot axis 50, and engages against a cylindrical peripheral surface 312 of the pivot bearing member head 130 which extends relative to the pivot axis 50, and when the pivot element 80 is displaced between the fixed position and the pivot position, the cylindrical peripheral surface 312 is movable relative to the terminating segment 308 and the ribs 310, but the terminating segment 308 having the ribs 310 is arranged in such a way that the terminating segment 308 engages against the cylindrical peripheral surface 312 with a tight seal by means of the ribs 310, in the pivot position as well as in the fixed position.

In particular the terminating segment 308 having the ribs 310 is produced undersized with respect to the cylindrical peripheral surface 312, so that the terminating segment having the ribs 310 engages against the cylindrical peripheral surface 312 with force action in the radial direction and provides the required sealing action.

The above-described exemplary embodiment according to the invention functions as follows.

Starting from the case that the pivot element 80 in its fixed position is either in the working position A or in the rest position R, and is thus fixed in this fixed position by the locking unit 180, actuation by pulling on the pull-wire 262 causes the rotary drive element 250 to turn in the rotational direction 260. Provided that the driver 258 has not yet reached the cam 256, the securing element 272 of the securing unit 270 is released due to the previously described interaction between the rotary drive element 250 and the securing unit 270.

After the angular distance W is passed through, the driver 258 reaches the cam 256 and acts on the actuating element 220 in such a way that the actuating element is rotated in the rotational direction 260, against the action of the torsion spring 240, from the locked position, in particular the clamped position in the locked position, in the direction of its released position. The locking elements 194 have the opportunity to move from the locked position, in particular the clamped position in the locked position, in the direction of their released position, as previously described.

After the actuating element 220 has turned far enough in the rotational direction 260 that the locking elements 194 have the opportunity to go completely into the released position, the push-out unit 280 becomes active in the described manner, and displaces the pivot element 80 from the fixed position into the pivot position in the described manner.

When the pivot element 80 is displaced from the fixed position into the pivot position, at the same time, the track follower 162 is disengaged from the recess 166, 168 in the fixing block unit 160 which is associated with the starting position.

In the pivot position, the toothed segments 114, 118, 124, 128, 134, 144 are no longer engaged with one another, and instead allow free pivotability about the pivot axis, so that after reaching the pivot position, the pivot element 80 together with the ball neck 40 is able to pivot about the pivot axis 50 from the starting position, for example the working position or the rest position, into the particular end position, for example the rest position or the working position, whereby immediately after the pivot element 80 begins to pivot about the pivot axis 50, the track follower 162 is situated opposite the guide track 164, not opposite one of the recesses 166 and 168.

If, immediately after the track follower 162 is situated opposite guide track 164, there is no longer action on the pull-wire 262, the rotary drive element 250 moves, opposite to the rotational direction 260, in the direction of its starting position, thus subjecting the actuating element 220 to the force action of the torsion spring 240, which endeavors to move the actuating element 220 from the released position into the locked position, and in particular into the clamped position thereof. This results in an action on the locking elements 194, which consequently act on the pull-in surface 189 and therefore generate the force F on the receptacle carrier 182, and thus also on the pivot element 80.

As a result, due to the force F, the guide track 164 acts against the track follower 162 with the force F, but the track follower 162 prevents the pivot element 80 from moving from the pivot position into the fixed position.

Thus, turning of the pivot element 80, and thus also of the ball neck 40, is possible until the ball neck has reached the particular end position in which the track follower 162 is once again situated opposite one of the recess 168 or 166. In this end position, the pivot element 80 is thus able to move from the pivot position into the fixed position, this taking place under the action of the force F generated by the locking elements 194 interacting with the pull-in surface 189, the force still being present when the locking elements act on the locking surfaces 188 of the receptacle carrier 182.

When the pivot element 80 moves from the pivot position into the fixed position, the toothed segments 114, 118, 124, 128 and 134 and 144 engage with one another, so that the fixing unit 110 once again provides a rotationally fixed fixing of the pivot element 80, and thus of the ball neck 40, in this end position, i.e., the rest position or the working position.

When the receptacle carrier 182 moves from the pivot position into the fixed position, the locking elements 194 also move from their released position into the locked position, in particular even the clamped position, under the action of the actuating surface sequence 224 in the described manner, so that the actuating element 220 thus also has the opportunity to move into the locked position, in particular into the clamped position of the locked position, so that the cam 256 is once again situated at an angular distance W from the driver 258 of the rotary drive element 250, so that once again the starting state is present, starting from which the functioning of the trailer coupling according to the invention has been described.

When the actuating element 220 moves back opposite the rotational direction 260, when the locked position is reached, the securing unit 270 once again becomes active by engagement of the securing element 272 with the securing receptacle 274, the securing element 272 being moved against the force of the spring 276 into the securing receptacle 274 by the rotary drive element 250, which is acted on by the torsion spring 264.

In a second exemplary embodiment of the trailer coupling according to the invention, illustrated in FIGS. 19 and 20, all elements which are identical to those of the exemplary embodiment described above are provided with the same reference numerals, so that reference may be made in full to the explanations in this regard.

In contrast to the first exemplary embodiment, the rotary drive element 250 is not drivable by a wire pull, and instead is provided with external teeth 320 which, for example, extend conically with respect to the pivot axis 50.

A drive pinion 322 is engaged with these external teeth 320, and is drivable by an actuating motor 324 which preferably also has an integrated reduction gearing.

In addition, a drive wheel 330 is provided between the inner bearing portion 96, which carries the inner guide surface 98, and the receptacle carrier 182 of the locking unit 180, the drive wheel 330, which is formed as a bevel gear, for example, being connected to the pivot bearing member 82 in a rotationally fixed manner.

A drive pinion 332 which is drivable by a swivel motor 334 is engaged with the drive wheel 330.

The swivel motor 334 as well as the actuating motor 324 are controllable by a control system, denoted as a whole by reference numeral 340, which controls the actuating motor 324 and the swivel motor 334 as follows.

If a transfer of the pivot element 80 into the pivot position is intended, for example starting from the fixed position of the pivot element 80 and the locked position of the locking unit 180, the control system 340 initially controls the actuating motor 324, so that the actuating motor moves the rotary drive element 250 from the starting position into the driving position, and in the driving position the actuating element 220 is then rotated in such a way that it goes from its clamped position or locked position into the released position, and the locking of the receptacle carrier 182 by the locking unit 180 is thus released.

In addition, the actuating element 220 continues to be rotated by the actuating motor 324 until the push-out unit 280 has pushed the pivot element 80 from the fixed position into the pivot position, as illustrated in FIG. 7, for example.

The actuating motor 324 is stopped after the pivot position is reached.

At the same time that the pivot position is reached, the swivel motor 334 is activated, which causes pivoting from the working position into the rest position, or from the rest position into the working position.

After the pivoting of the pivot element 80 has begun, the actuating motor 324 may be operated in the reverse direction, so that the rotary drive element 250, driven by the actuating motor 324, once again moves into the starting position.

Without the actuating motor 324 acting on the actuating element 220, the torsion spring 240 acts on the actuating element, and the actuating element 220 in turn acts on the locking elements 194 in the direction of the locked position, so that the locking elements generate the force F on the pivot element 80 by acting on the pull-in surface 189.

However, until the particular end position, i.e., the working position or the rest position, is reached, the force F does not result in a movement in the direction of the fixed position, since this movement is prevented by the interaction of the track follower 162 with the guide track 184.

As soon as the pivot element 80 has reached the end position, i.e., the rest position or the working position, the receptacle carrier 182, and therefore the pivot element 80, moves in the direction of the fixed position, since the locking elements 194 are acted on by the actuating element 220, in particular the actuating surface sequence 224, and, triggered by the torsion spring 240, generate the force F, and the transition into the fixed position is possible in that in the particular end position, the track follower 162 is able to enter into the recess 166 and 168, thus allowing the pivot element 80 to move from the pivot position into the fixed position.

After the end position is reached in each case, the control system 340 switches off the swivel motor 334.

The invention claimed is:

1. A trailer coupling comprising a mounting unit which is fixedly connectable to a vehicle body;
   a pivot bearing unit, provided on the mounting unit, having a pivot bearing base which is fixedly connected to the mounting unit, and having a pivot element which is pivotable about a pivot axis, relative to the pivot bearing base, between a working position and a rest position, and is displaceable in the direction of the pivot axis between a fixed position and a pivot position;
   a ball neck which at one end is mounted on the pivot element and which at the other end carries a coupling ball, and which, due to the pivotability of the pivot element, is pivotable about the pivot axis between the working position and the rest position, and due to the displaceability of the pivot element is displaceable between the fixed position and the pivot position;
   a fixing unit which, in the fixed position of the pivot element, fixes the pivot element, and thus also the ball neck, relative to the pivot bearing base in a rotationally fixed manner by means of positive-fit elements, and in the pivot position allows pivoting; and
   a locking unit, which acts axially against a displacement in the direction of the pivot axis, by means of which, in the fixed position, the fixing unit is fixable against a movement in the direction of the pivot position,
   the fixing unit having a fixing unit first toothed segment which is fixedly connected to the pivot bearing base,
   a pivot element first toothed segment which is connected to the pivot element in a rotationally fixed manner and pivots together with the pivot element,
   wherein, in the working position, the fixing unit first tooth segment and pivot element first tooth segment are engageable by displacing the pivot element from the pivot position into the fixed position, and
   wherein, in the working position, the fixing unit first toothed segment and pivot element first toothed segment are disengageable by displacing the pivot element from the fixed position into the pivot position.

2. A trailer coupling according to claim 1, wherein the fixing unit has a further fixing unit first toothed segment which is fixedly connected to the pivot bearing base,
   wherein, in the rest position, the pivot element first toothed segment is engageable with the further fixing unit first toothed segment by displacing the pivot element from the pivot position into the fixed position, and
   wherein, in the rest position, the pivot element first toothed segment is disengageable from the further fixing unit first toothed segment by displacing the pivot element from the fixed position into the pivot position.

3. A trailer coupling according to claim 2, wherein the further fixing unit first toothed segment is fixedly disposed on a positive-fit element carrier.

4. A trailer coupling according to claim 3, wherein the fixing unit further first toothed segment is disposed on the positive-fit element carrier in a positive-fit manner.

5. A trailer coupling according to claim 1, the fixing unit having a fixing unit second toothed segment which is fixedly connected to the pivot bearing base,
   further including a pivot element second toothed segment which is connected to the pivot element in a rotationally fixed manner and pivots together with the pivot element, and
   wherein, in the working position, the fixing unit second toothed segment and the pivot element second toothed segment are engageable by displacing the pivot element from the pivot position into the fixed position, and
   wherein, in the working position, the fixing unit second toothed segment and the pivot element second toothed segment are disengageable by displacing the pivot element from the fixed position into the pivot position.

6. A trailer coupling according to claim 5 wherein the fixing unit has a further second toothed segment which is fixedly connected to the pivot bearing base,
   wherein, in the rest position, the pivot element second tooth segment is engageable with the further fixing unit second tooth segment by displacing the pivot element from the pivot position into the fixed position, and
   wherein, in the rest position, the pivot element second toothed segment is disengageable from the further fixing unit second toothed segment by displacing the pivot element from the fixed position into the pivot position.

7. A trailer coupling according to claim 6, wherein the pivot element second toothed segment is disposed positive-fit element carrier of the pivot element.

8. A trailer coupling according to claim 7, wherein the pivot element second toothed segment is integrally formed onto the positive-fit element carrier of the pivot element.

9. A trailer coupling according to claim 6, wherein the fixing unit further second toothed segment is fixedly disposed on the a stationary positive-fit element carrier.

10. A trailer coupling according to claim 9, wherein the fixing unit further second toothed segment is disposed on the stationary positive-fit element carrier in a positive-fit manner.

11. A trailer coupling according to claim 6, wherein the fixing unit second toothed segment is stationarily disposed on a stationary positive-fit element carrier which is fixedly connected to the pivot bearing base.

12. A trailer coupling according to claim 11, wherein the fixing unit second toothed segment is integrally formed onto the stationary positive-fit element carrier.

13. A trailer coupling according to claim 5, wherein the fixing unit and pivot element first toothed segments are situated at a first radial distance from the pivot axis, and the fixing unit and pivot element second toothed segments are situated at a second radial distance from the pivot axis which is different from the first radial distance, so that the fixing unit and pivot element first toothed segments and the fixing unit and pivot element second toothed segments are movable relative to one another without colliding when the pivot element moves about the pivot axis and in the direction of the pivot axis.

14. A trailer coupling according to claim 1, wherein the pivot element first toothed segment, which is pivotable together with the pivot element, is disposed on a positive-fit element carrier of the pivot element.

15. A trailer coupling according to claim 14, wherein the pivot element first toothed segment is integrally formed onto the positive-fit element carrier of the pivot element.

16. A trailer coupling according to claim 1, wherein the fixing unit first toothed segment is stationarily disposed on a positive-fit element carrier which is fixedly connected to the pivot bearing base.

17. A trailer coupling according to claim 1, wherein the fixing unit first toothed segment is integrally formed onto a positive-fit element carrier.

18. A trailer coupling according to claim 1, wherein the locking unit is actuatable by an actuating motor.

19. A trailer coupling according to claim 1, wherein the pivot element is pivotable between the working position and the rest position by means of a swivel motor.

20. A trailer coupling according to claim 1, further including a further pivot element first toothed segment which is connected to the pivot element in a rotationally fixed manner, wherein, in the rest position, the fixing unit first toothed segment is engageable with the further pivot element first toothed segment by displacing the pivot element from the pivot position into the fixed position, and wherein, in the rest position, the fixing unit first tooth segment is disengageable from the further pivot element first tooth segment by displacing the pivot element from the fixed position into the pivot position.

21. A trailer coupling comprising a mounting unit which is fixedly connectable to a vehicle body;

a pivot bearing unit, provided on the mounting unit, having a pivot bearing base which is fixedly connected to the mounting unit, and having a pivot element which is pivotable about a pivot axis, relative to the pivot bearing base, between a working position and a rest position, and is displaceable in the direction of the pivot axis between a fixed position and a pivot position;

a ball neck which at one end is mounted on the pivot element and which at the other end carries a coupling ball, and which, due to the pivotability of the pivot element, is pivotable about the pivot axis between the working position and the rest position, and due to the displaceability of the pivot element is displaceable between the fixed position and the pivot position;

a fixing unit which, in the fixed position of the pivot element, fixes the pivot element, and thus also the ball neck, relative to the pivot bearing base in a rotationally fixed manner by means of positive-fit elements, and in the pivot position allows pivoting; and a locking unit, which acts axially against a displacement in the direction of the pivot axis, by means of which, in the fixed position, the fixing unit is fixable against a movement in the direction of the pivot position, the axially acting locking unit having a central receptacle carrier, which has at least one locking receptacle that is radially outward relative to the pivot axis, the central receptacle carrier being connected to the pivot element to be non-displaceable in the direction of the pivot axis and being movable together with the pivot element in the direction of the pivot axis, the locking unit having at least one locking element, which is situated in a space around the receptacle carrier and may be brought into a locked position that acts on the locking receptacle for holding same in the fixed position, the locking unit having a guide member which is connected to the pivot bearing base and which has at least one guide for the at least one locking element, the guide specifying a direction of movement for the at least one locking element for a movement between the locked position and a released position, the locking unit having an actuating element which acts on the at least one locking element from a side opposite from the receptacle carrier, and by means of the actuating element, a movement of the locking element from the released position into the locked position may be produced, or a movement of the locking element from the locked position into the released position may be enabled.

22. A trailer coupling according to claim 21, wherein the central receptacle carrier has at least two locking receptacles, that at least two locking elements are situated in the space around the central receptacle carrier, and that the guide member has at least two guides for the at least two locking elements.

23. A trailer coupling according to claim 21, wherein the actuating element is pivotable about the pivot axis and has at least one actuating surface sequence which includes a surface area that is most outward in the radial direction and a surface area that is most inward in the radial direction, and that the at least one locking element is in its released position when it engages against the surface area which is most outward in the radial direction, and is in its locked position when it engages against the surface area which is most inward in the radial direction.

24. A trailer coupling according to claim 21, wherein the actuating element radially outwardly encloses the receptacle carrier and the at least two locking elements.

25. A trailer coupling according to claim 24, wherein the actuating element has a ring-shaped actuating surface member on which the at least one actuating surface sequence is situated.

26. A trailer coupling according to claim 21, wherein the actuating element is continually acted on in the direction of its locked position by an elastic energy store.

27. A trailer coupling according to claim 21, wherein the actuating element is fixable in its locked position against a movement into its released position by means of a securing unit.

28. A trailer coupling according to claim 21, wherein the actuating element is actuatable via a rotary drive element which is movable from a starting position into a driving position.

29. A trailer coupling according to claim 28, wherein the securing unit is movable by the rotary drive element from an unsecured position into the secured position.

30. A trailer coupling according to claim 29, wherein the rotary drive element allows a transition of the securing unit into the unsecured position no later than when the actuating element is actuated for moving same into the released position.

31. A trailer coupling according to claim 28, wherein the rotary drive element is acted on by an elastic energy store in the direction of a starting position.

32. A trailer coupling according to claim 21, wherein the axially acting locking unit has an axially acting push-out unit.

33. A trailer coupling according to claim 32, wherein the push-out unit has a push-out element, acting in the direction of the pivot axis, by means of which the pivot element is displaceable from the fixed position into the pivot position.

34. A trailer coupling according to claim 33, wherein the push-out element acts on a pressure absorption element that is coupled to the pivot element.

35. A trailer coupling according to claim 34, wherein the push-out element together with the pressure absorption element moves the pivot element from the fixed position into the pivot position if the at least one locking element is able to reach its released position.

36. A trailer coupling according to claim 21, wherein the at least one locking element in the locked position is supported on the guide.

37. A trailer coupling according to claim 21, wherein the at least one guide is formed by a recess in the guide member.

38. A trailer coupling according to claim 37, wherein in the locked position of the locking element in which it engages with the locking receptacle, the locking element is supported on a base of the recess.

39. A trailer coupling according to claim 21, wherein the guide member and a stationary positive-fit element carrier of the fixing unit are connected to one another.

40. A trailer coupling according to claim 39, wherein the guide member and the positive-fit element carrier form an integral part.

41. A trailer coupling according to claim 39, wherein the guide is situated on a side opposite from the positive-fit elements of the stationary positive-fit element carrier.

42. A trailer coupling comprising a mounting unit which is fixedly connectable to a vehicle body;
- a pivot bearing unit, provided on the mounting unit, having a pivot bearing base which is fixedly connected to the mounting unit, and having a pivot element which is pivotable about a pivot axis, relative to the pivot bearing base, between a working position and a rest position, and is displaceable in the direction of the pivot axis between a fixed position and a pivot position;
- a ball neck which at one end is mounted on the pivot element and which at the other end carries a coupling ball, and which, due to the pivotability of the pivot element, is pivotable about the pivot axis between the working position and the rest position, and due to the displaceability of the pivot element is displaceable between the fixed position and the pivot position;
- a fixing unit which, in the fixed position of the pivot element, fixes the pivot element, and thus also the ball neck, relative to the pivot bearing base in a rotationally fixed manner by means of positive-fit elements, and in the pivot position allows pivoting; and
- a locking unit, which acts axially against a displacement in the direction of the pivot axis, by means of which, in the fixed position, the fixing unit is fixable against a movement in the direction of the pivot position,
- the pivot element having a central pivot bearing member which is mounted in a pivot member bearing seat in the pivot bearing base that radially outwardly encloses the central pivot bearing member so as to be pivotable about the pivot axis, the pivot bearing member being mounted so as to be displaceable between the pivot position and the fixed position in the direction of the pivot axis.

43. A trailer coupling according to claim 42, wherein the central pivot bearing member carries a central receptacle carrier of the axially acting locking unit which has at least one locking receptacle, the central receptacle carrier being connected to the pivot bearing member so that it is not displaceable in the direction of the pivot axis.

44. A trailer coupling according to claim 43, wherein at least one locking element of the axially acting locking unit is situated in a space around the receptacle carrier, the locking element being guided in a guide of a guide member which is supported on the pivot bearing base, and being engageable or disengageable with the at least one locking receptacle by means of an actuating element situated on a side of the locking element facing away from the receptacle carrier.

45. A trailer coupling according to claim 42, wherein the pivot bearing member and the receptacle carrier are fixedly connected to one another.

46. A trailer coupling according to claim 45, wherein the pivot bearing member and the receptacle carrier form an integral part.

47. A trailer coupling according to claim 42, wherein a stationary positive-fit element carrier of the fixing unit is situated radially outwardly in a region of the pivot bearing base which extends around the pivot bearing member.

* * * * *